United States Patent
Kouloheris et al.

[11] Patent Number: 5,915,094
[45] Date of Patent: Jun. 22, 1999

[54] DISK ACCESS METHOD FOR DELIVERING MULTIMEDIA AND VIDEO INFORMATION ON DEMAND OVER WIDE AREA NETWORKS

[75] Inventors: Jack Lawrence Kouloheris, Mohegan Lake; Manoj Kumar, Yorktown Heights, both of N.Y.

[73] Assignee: International Business Machines Corporation, Armonk, N.Y.

[21] Appl. No.: 08/866,671

[22] Filed: Jun. 2, 1997

Related U.S. Application Data

[63] Continuation of application No. 08/350,364, Dec. 6, 1994, abandoned.

[51] Int. Cl.$^6$ .............................. G06F 13/38; G06F 15/17
[52] U.S. Cl. .............................. 395/200.49; 395/200.61; 345/327; 370/486
[58] Field of Search .............................. 348/7, 8, 12, 13, 348/15; 455/4.1, 4.2, 5.1, 6.1, 6.2, 6.3; 370/339, 485, 486, 487; 395/200.47, 200.48, 200.49, 200.61; 345/327; 711/111, 112

[56] References Cited

U.S. PATENT DOCUMENTS

| | | | |
|---|---|---|---|
| 4,577,240 | 3/1986 | Hedberg et al. | 360/22 |
| 5,128,810 | 7/1992 | Halford | 360/39 |
| 5,148,432 | 9/1992 | Gordon et al. | 371/10.1 |
| 5,163,131 | 11/1992 | Row et al. | 395/200 |
| 5,166,939 | 11/1992 | Jaffe et al. | 371/40.1 |
| 5,206,943 | 4/1993 | Callison et al. | 395/425 |
| 5,218,689 | 6/1993 | Hotle | 395/425 |
| 5,249,279 | 9/1993 | Schmenk et al. | 395/425 |
| 5,301,310 | 4/1994 | Isman et al. | 395/575 |
| 5,313,585 | 5/1994 | Jeffries et al. | 395/275 |
| 5,355,453 | 10/1994 | Row et al. | 395/200 |
| 5,414,455 | 5/1995 | Hooper et al. | 348/7 |
| 5,442,390 | 8/1995 | Hooper et al. | 348/7 |
| 5,448,568 | 9/1995 | Delpuch et al. | 372/94.2 |
| 5,469,548 | 11/1995 | Callison et al. | 395/441 |
| 5,508,732 | 4/1996 | Bottomley et al. | 348/7 |
| 5,510,905 | 4/1996 | Birk | 358/342 |

OTHER PUBLICATIONS

Tanebaum, Computer Networks, Prentice Hall, Engelwood Cliffs, NJ, 1981, Chapters 1, 5 and 8, pp. 1–31, 187–246, and 324–382, Dec. 1981.

*Primary Examiner*—Mark H. Rinehart
*Attorney, Agent, or Firm*—Douglas W. Cameron; Ronald L. Drumheller

[57] ABSTRACT

A method and apparatus for delivering multimedia video data from a server (host processor) to a plurality of clients connected to a communications network. More specifically, with this invention, preprocessed video and multimedia data packets are striped across disks in units of fixed playback time, even if such units result in variable length stripes. To deliver multiple video or continuous media streams, the disks in the array are accessed simultaneously so that at any given instance, different disks are accessing the video or multimedia data for different streams. Access to the disks for reading the continuous media files is scheduled periodically, with the period equal to the back time of the stripes. Because each disk read command retrieves data for a fixed play back time, if the first read command for a continuous media stream request can be scheduled to complete on a disk within a playback time, all subsequent read commands are also guaranteed to not interfere with read commands of other streams. Data is delivered directly from the disk array to the communication network by a stream controller without being sent to the host system. Disk storage is utilized efficiently by allocating disk space in units of cylinders and storing the variable size stripes of video in packed format.

9 Claims, 16 Drawing Sheets

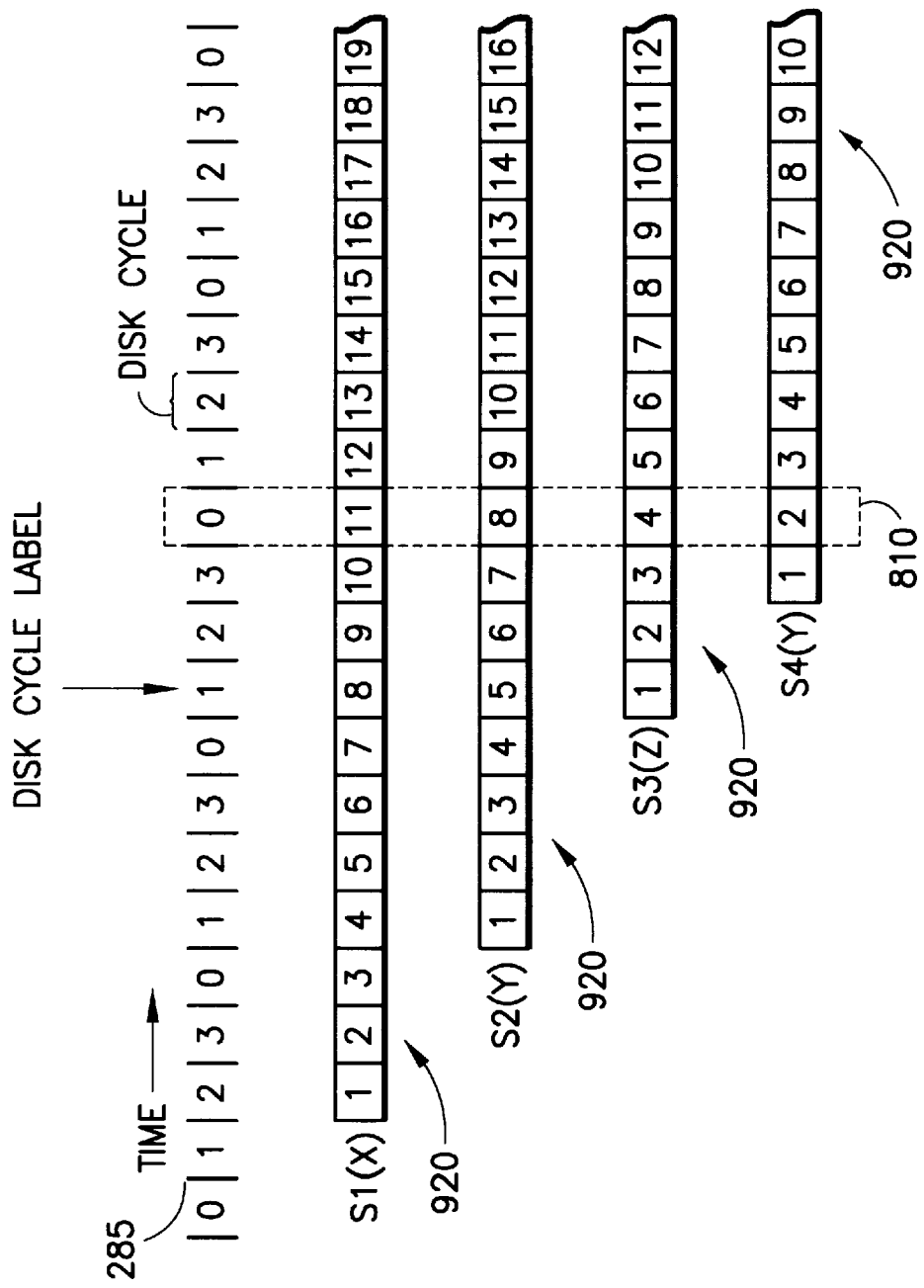

DISK ACCESS METHOD FOR DELIVERING MULTIMEDIA AND VIDEO INFORMATION ON DEMAND OVER WIDE AREA NETWORKS

This is a continuation of application Ser. No. 08/350,364, filed Dec. 6, 1994, now abandoned.

TECHNICAL FIELD

This invention relates to a method and apparatus for delivering data, essentially multimedia/video data, from a server over a communications network to a large number of requesting clients.

DESCRIPTION OF THE PRIOR ART

It is widely believed that the advances in technology will enable residential and commercial interactive multimedia services. The contemplated residential services are video on demand for movies, new, sports, TV programs etc., home shopping, interactive games, surrogate travel, and a wide variety of educational and information services, to name a few. The commercial services are video mail, conference records, multimedia manuals, training, and industry specific uses such as video footage of homes for sale used in the real estate industry and video footage of vacation resorts in the travel industry.

The increasing level of integration in VLSI technology has helped in bringing down compression/decompression hardware and enabled technologies like ADSL (Asymmetric Digital Subscriber Loop). These two make it practical to transmit and receive motion video from a users home, and switch it in the local telephone office, thus providing each user his dedicated video channel. Similarly, the advances in fiber optic transmission technology and its declining costs have enabled the upgrades in the cable TVs trunk and feeder systems which increase the bandwidth of the network sufficiently to provide each active subscriber his dedicated channel to the head-end for receiving compressed digital video. Direct broadcast satellites and other emerging wireless communication technologies also provide dedicated video channels between a large number of end users and a server. Personal computers and set top boxes are also emerging which enable networked multimedia applications, taking advantage of the low cost video compression/decompression hardware and new powerful, but inexpensive microprocessors.

While the end user (client) systems and the network infrastructure is evolving rapidly to meet the requirements of interactive multimedia services, the currently proposed servers are impractical for delivering interactive multimedia services, especially for delivering video to clients for just in time use, directly over a broadband network. The current choice of servers for interactive multimedia services has been off-the-shelf mainframes or work-station technology based parallel/clustered computing systems. Their system architecture, hardware organization, operating systems, and I/O subsystems are ill suited for delivery of multimedia data as explained below.

The hardware of the mainframes and work station based parallel or clustered systems is optimized for processing intensive applications, with very limited emphasis on moving data between the network interfaces and the I/O devices, which is the primary requirement for a video server. For example, the bandwidth from the memory to cache in an RS/6000 workstation is 400 MBytes/sec. while that from the I/O or network devices to the system is only 80 MBytes/sec. The floating point unit adds to the cost of the system without providing any benefit to the delivery of video/multimedia data. The caches are too small for capturing any locality in the accesses to multimedia data.

The operating system of the mainframes or parallel computer based servers is optimized to maximize the utilization of the CPU, and to maximize the system throughput in a time sharing environment. All jobs (tasks/processes/threads) are implicitly assumed to be CPU bound. Accordingly, the I/O subsystem is also optimized to transfer data requested by an I/O request at maximum bandwidth and minimum latency. The support needed to guarantee the availability of system resources to meet the deadlines of the real time tasks, if present at all, is limited to assigning a higher priority to these real time tasks.

In contrast, in a large video server the performance would be I/O bandwidth bound, and the management of the system resources such as CPU, memory, and I/O devices has to be done accordingly. The number of tasks (processes or threads) is much larger than that in a time sharing system. Each of these tasks which corresponds to a video stream, must meet the real time constraint of delivering enough data to a client to support interruption free playback of video. Furthermore, as explained in more detailed later, each task requires data to be retrieved from the disks and delivered to the network at the rate of few hundred KBytes/sec. to few MBytes/sec. For each multimedia stream, data has to be retrieved in few tens to few hundred KByte chunks at regular intervals, to avoid the need for large buffers in the server. The video data must be delivered to the network in even smaller chunks, at regular intervals.

Furthermore, in the above servers multimedia data is stored as an standard operating system file on an array of magnetic disks. From there it is read into some processor's data memory where it is processed through a network protocol prior to its transmission over a network interface. This unnecessarily slows down the transmission of multimedia data from the server to the clients due to two reasons. First of all, the I/O bus (or data path) connecting the data memory to the disk array and network interfaces has to be used twice, thus halving the transfer rate that would be achieved if the data could be transferred directly from the disk array to the network interfaces. Secondly, the speed of the CPU which executes the network protocols limits the rate at which data can be sent from the disk array to the network.

Finally, the disk array subsystem itself is usually optimized to retrieve data requested by a single I/O request with a minimum latency and highest bandwidth. The high bandwidth is achieved by reading data in large blocks from the disk array, which creates the need for large semiconductor storage buffers if large number of multimedia streams have to be supported simultaneously. This increases the total cost of the server significantly. Reference [8] is an excellent review of the state of the art in storage systems based on array of disks. Thus, in brief, the architecture and hardware organization of the current multimedia servers and the disk array subsystem are optimized for an environment very different from interactive multimedia servers, and therefore, the current servers are not cost effective for delivering multimedia information.

A cost effective solution to the above problem of delivering multimedia/video data to large number of clients simultaneously is also applicable to transferring large files from servers to clients over a broadband network. In this situation, even though the clients are capable of accepting data from the network at a much higher rate than a typical multimedia/video client, the cost structure expected for the network usage will require data to sent in regularly spaced chunks of small size at a pre-negotiated aggregate bandwidth, which is much lower than the bandwidth of the I/O subsystem in the server.

The above mentioned limitations in using general purpose computers as video servers force the price/performance of such servers to be much higher than that of a system designed optimally for delivery of video. The publicly acknowledged activity in addressing the limitations of using general purpose computers as video servers has been so far minimal and restricted to optimizing the placement of data on an array of disks to maximize the disk throughput in video server applications [3, 4], and in optimizing the policy for buffering data retrieved from the disks to maximize its reuse in the video server environment [5, 6], or in optimizing the file system for video data [7]. Such improvements can improve the price performance of current video server systems by a factor of two or four, but improvements by a factor of few hundred are needed to make the interactive multimedia services economically feasible.

The streaming RAID (Redundant Array of Inexpensive Disks) system [9] uses a disk array subsystem in which a single I/O request is satisfied by accessing data simultaneously from all disks in the array. If the data retrieved from each disk is large enough to yield a reasonable utilization of the disk bandwidth, the data for the whole request is very large requiring large semiconductor buffers. If the data retrieved from each disk is sufficiently small to maintain a reasonable size for the total data returned, the bandwidth utilization of the disks in the array will be very low.

U.S. Pat. No. 5,313,585 to Jeffries et al describes a disk array controller which fragments each I/O request received from the system CPU into multiple atomic operations (disk commands). Each disk in the array has its own disk queue, and the atomic disk commands generated by the array controller are enqueued into the disk queues of several disks. However, all the atomic disk operations required to complete a single I/O request are enqueued in the disk queue before the atomic disk commands for the next I/O request are queued. Thus, all the data required by an I/O request will be fetched at once and multiple disks will be working simultaneously to return the data requested by one I/O request to the CPU at very high bandwidth at any given time. The I/O requests are thus handled sequentially with respect to each other. The disk controllers associated with the individual disks can execute the commands in the disk queue in an order different from the order in which the array controller enqueued the commands in the disk queue. Such reordering is done by the disk controller to maximize the disk throughput, and will result in some over lap between the execution of only a few disk commands. The above scheme works well in a computing environment where it is advantageous to return all the data specified in an I/O request to the system CPU as quickly as possible. However, in the multimedia server environment it is desirable to send a video file at the rate at which data is used up to play back the video, and hence the above scheme has the disadvantage of requiring large buffers in the CPU to hold the video data before it is actually needed for the for the play back of video.

U.S. Pat. No. 5,301,310 to Isman et al teaches a disk array system in which the smallest logical unit of data stored in the disk array, a 64 bit word in the preferred embodiment but a Byte in most traditional disk arrays, is striped across all disks in the system. Furthermore, the bits derived of a word can be stored on different locations on each disk. However, this scheme also performs well only when retrieving data for one or few I/O requests a high bandwidths, and is not appropriate for handling multiple low bandwidth I/O requests concurrently, as required in a video server. Thus, this patent is also unrelated to our invention.

U.S. Pat. No. 5,128,810 to Halford teaches a disk array in which all the disks are spindle synchronized, and sub-parts of each word gets read from or written to all the disks simultaneously. Thus, the array is forced to handle only one I/O request at any given time. This patent is unrelated to our invention, because in our invention the disks are not spindle synchronized, and at any given time different disks access data on behalf of different requests.

U.S. Pat. No. 5,218,689 to Hotle teaches a disk array in which commands are send from the host computer directly to the individual disk drive controllers. The principal advantage of such a system is that a RAID controller can be implemented in software in the host system, without requiring a dedicated array controller. Furthermore, the redundancy and striping policies can be chosen by the host processor depending on the application needs, and are not predetermined by the array controller design. However, this patent does not teach the dividing of multiple I/O requests, possible each for a different continuous media stream, each into multiple disk commands, and issuing the disk commands to the individual disks according to a schedule that sends disk commands on behalf of different I/O requests to different disks at any given time.

U.S. Pat. No. 5,249,279 to Schmenk et al teaches a disk array in which the host CPU sends a command list to the array controller, the command list consisting of the individual disk access commands. This patent also does not teach the dividing of multiple I/O requests, possible each for a different continuous media stream, each into multiple disk commands, and issuing the disk commands to the individual disks according to a schedule that sends disk commands on behalf of different I/O requests to different disks at any given time.

U.S. Pat. No. 5,206,943 to Callison et al describes a disk array system comprising of multiple disks connected through multiple channels to a transfer controller. The transfer controller is also connected to a buffer memory, I/O bus of a host system, and a local processor. The local processor performs the tasks of programming the DMA channels for moving data between the disks to the buffer, and between the buffers and the host system. This patent also does not teach the dividing of multiple I/O requests, possibly each for a different continuous media stream, each into multiple disk commands, and issuing the disk commands to the individual disks according to a schedule that sends disk commands on behalf of different I/O requests to different disks at any given time.

U.S. Pat. No. 5,148,432 to Gordon et al describes a disk array subsystem in which a microprocessor in an array controller establishes the DMA channels for moving data from the array of disks to a buffer memory, and from the buffer memory to the host computer. This microprocessor also implements the RAID functions in software. This paper also does not describe the method of handling multiple I/O requests concurrently in a manner that data for a particular access is fetched from one disk at a time, while other disks in the system are accessing data on behalf of different requests.

U.S. Pat. No. 5,163,131 to Row et al teaches a network file server comprising of network controller units, file controller units, and storage processor units which off-load the IP & NFS protocol processing, file system services, and storage device driver functions form the host processor. In this patent, an I/O request from the client is sent directly from the receiving network controller unit to a file controller unit and from their to a storage processor unit. Furthermore, all the data requested by the I/O request is send immediately to the client. Once again, this patent too does not address the problems solved by our invention nor does it propose the teachings of our invention.

SUMMARY OF THE INVENTION

The above mentioned problems are solved by offloading the delivery of continuous media data from the host processor of a traditional server to a stream control subsystem, which is added to the traditional server to off-load or assist the host, which is a general purpose computer. A stream control subsystem, henceforth abbreviated as stream controller, accepts video stream control commands from the host which are essentially similar to the VCR commands like PLAY, PAUSE, FAST FORWARD, and REWIND etc., and in response, transmits the specified video data to a specified client at the appropriate rate.

The stream controller contains a microprocessor based subsystem running a real time kernel to divide an I/O request for a continuous media stream into read commands which are issued periodically to the disks. This micro processor also executes a network protocol on the data retrieved from the disks, and schedules the transmission of the video packets over the network. The stream control table and schedule table, which are data structures maintained in the stream controller subsystem regulate all the real time operations (operations which must meet a deadline).

Video data (data units) is divided into stripes which are interleaved (striped) across all disks in the array to avoid a few disks with popular movies from becoming a bottle neck. At the same time, the size of the stripes is chosen to be approximately anywhere in the range of one or more tracks to maintain reasonable throughput from individual disks. Consequently, a read command to the disk array from one stream can be satisfied by one disk (or a set of disks). To get high throughput from the entire array, read commands on behalf of multiple streams are issued concurrently. While data for each stream (which is requested by a single I/O request) is read from a single disk (or a set of disks) at any given instance, data for different streams (which correspond to different I/O requests) is read at the same distance from different sets of disks to maintain high data transfer rate. The stream control table is used to schedule the access for reading each disk by all the active streams.

The stream controller controls an array of disks, dedicated for storing continuous media data, and has stream buffers to hold data read from the disks. To further off-load the host, network protocol processing on the data read from the disks is carried out in the stream buffers, and the network packets thus generated are then transferred directly to the network interface from the stream buffers. Thus, the continuous media data is not moved in and out of the host memory, resulting in better utilization of the host system I/O bandwidth, and requiring less host CPU cycles due to elimination of network protocol processing overhead from the host CPU, both of which result in the ability to deliver many more streams than what would be possible without the stream control subsystem.

As a further improvement, instead of carrying out the full network protocol processing in the stream controller as described above, continuous media data is stored on the disk array in the format of network packets so that data retrieved from the disks can be transmitted over the network with minimal additional protocol processing. All the precomputable fields in the header/trailer of the packet are precomputed, and the remaining fields are calculated by the microprocessor in the stream controller prior to the transmission of the packet. This prevents the microprocessor from becoming a bottleneck due to the protocol processing overheads.

In another refinement of the invention, the data units are striped (interleaved) across all disks in the array in variable size stripes, where each stripe contains continuous media data for a fixed playback duration. Disk storage is allocated in units of cylinders, and the variable size stripes are stored in packed format in each cylinder. Additional link fields are also stored with the portions (stripes) of data accessed by consecutive read commands so that the stream controller can find the consecutive sections of a video stream without the involvement of a host processor. Essentially a storage format optimal for retrieval of video data and its delivery over the network, is used to store the continuous media on the disks.

BRIEF DESCRIPTION OF THE DRAWINGS

FIG. 11 illustrates the four continuous media streams and their relationship to disk cycles.

DESCRIPTION OF THE PREFERRED EMBODIMENT

Figure 1:
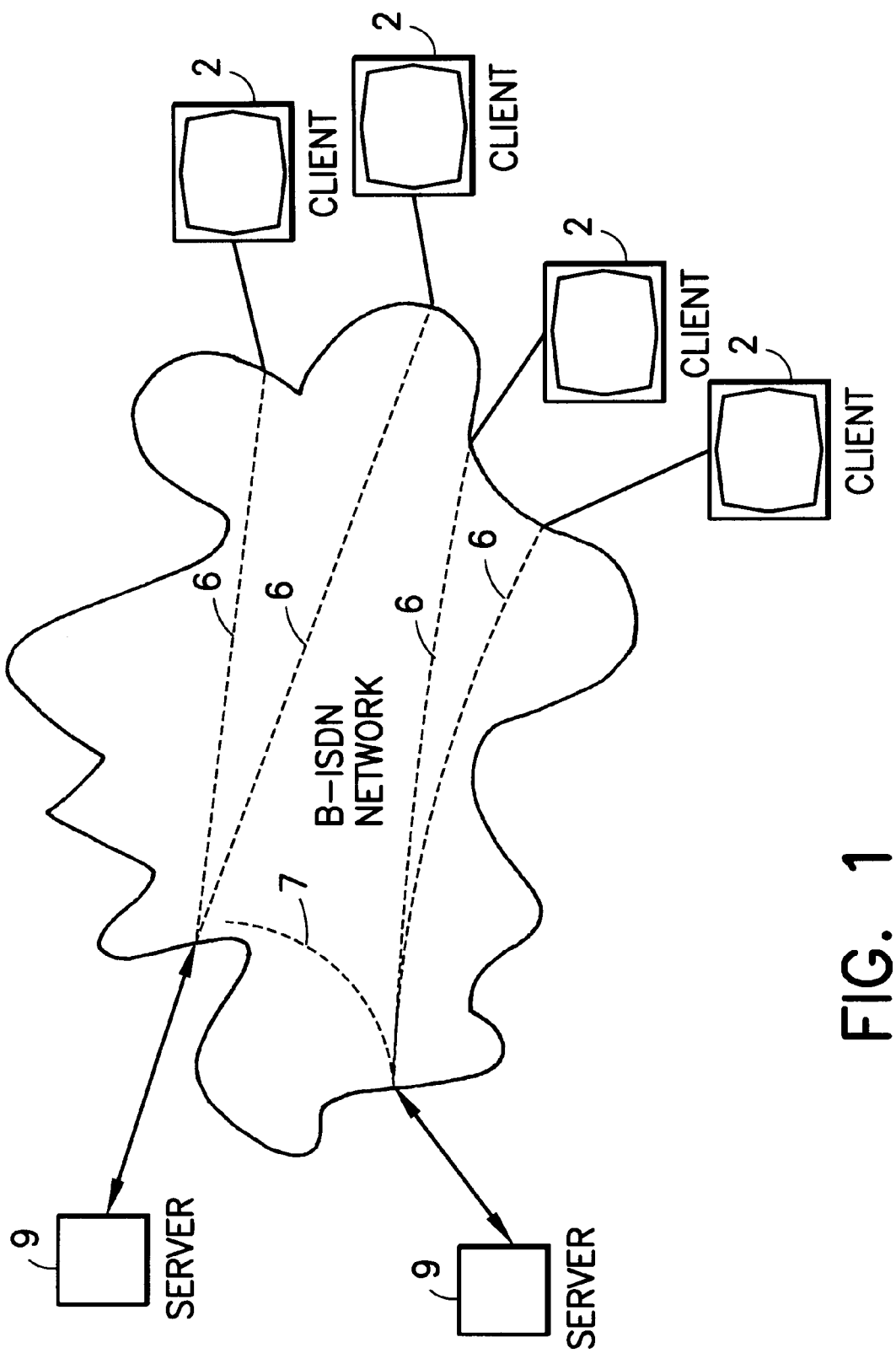
FIG. 1 illustrates the interactive multimedia services environment, where a plurality of clients access one or more servers over a broadband network.

FIG. 1 shows the over all environment in which our invention operates. It shows a plurality of clients 2 connected to a B-ISDN (Broadband-Integrated Services digital network 5. The clients run interactive multimedia on the servers 9 also connected to the B-ISDN network. The network supports both the connections 6 between the clients and the servers, and the connections 7 between the servers belonging to the same enterprise.

Figure 2:
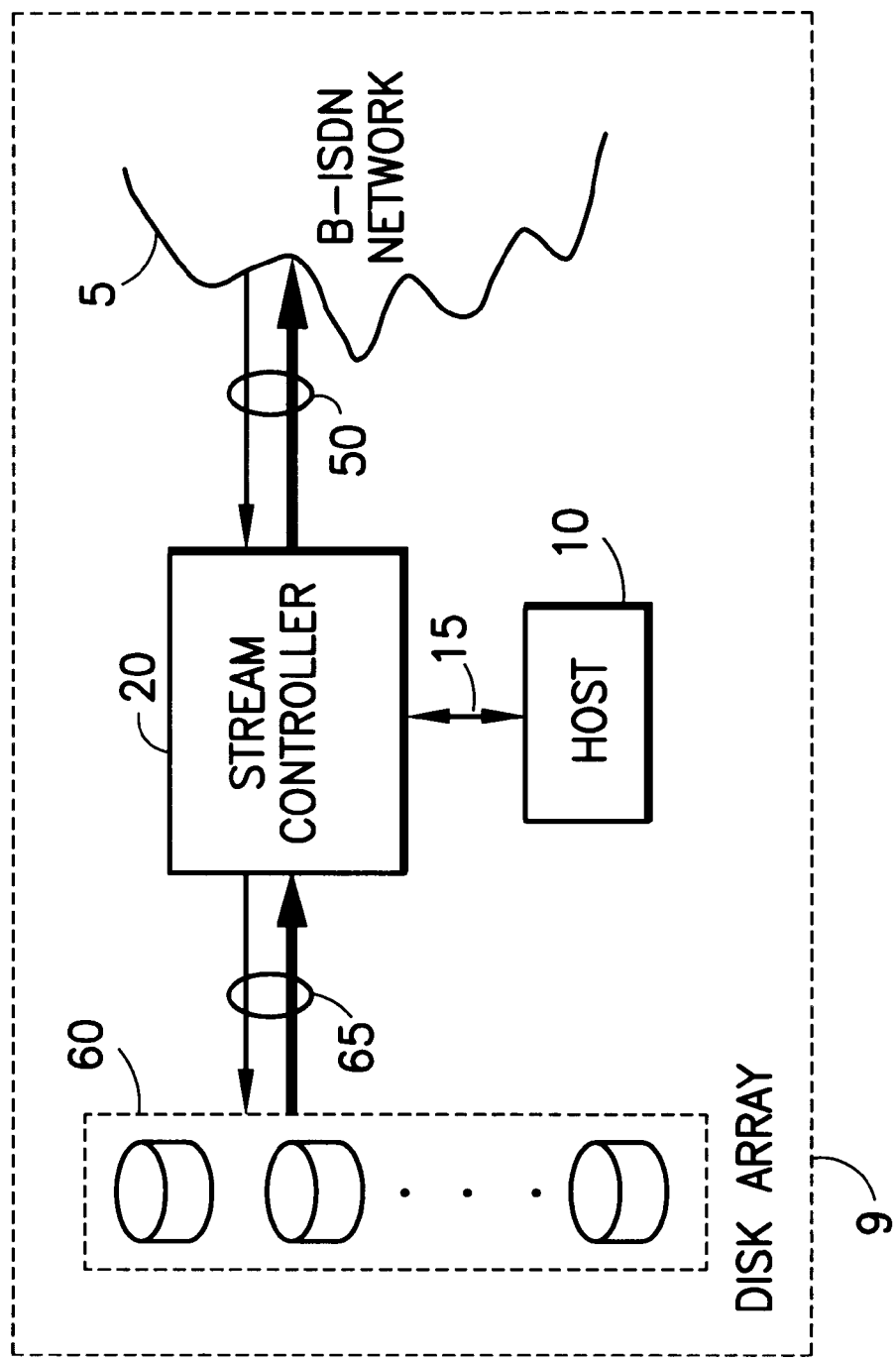
FIG. 2 illustrates the high level organization of the interactive multimedia server, and shows the connectivity between the host, stream controller, and the disks.

FIG. 2 is a high level view of the continuous media delivery system, or server 9. It comprises of a host 10, which is a general purpose computer like the RS/6000 workstation, connected to the continuous media stream controller 20 through a host I/O channel 15. The stream controller connects to an array of disks 60 through multiple SCSI [10] (small computer systems interface) buses 65, each SCSI bus connecting to multiple disks. A stream controller capable of serving 250 MPEG-1 (motion picture experts group) digital compressed video streams [11] requires four fast and wide SCSI buses 65, each connecting to more than 8 disks. Reference [10] is hereby incorporated herein by reference.

In the following sections we first describe the stream controller in further detail. Then we describe the program for delivering continuous media streams autonomously from the stream controller. The next section addresses the striping of continuous media data in variable size stripes, and allocation of disk storage in units of cylinders. In the last section we describe the method of accessing the disks in the array 60 in which all disks are accessed simultaneously but for different continuous media streams, and the scheduling of accesses to the disk that guarantees that disks will not be overloaded.

The stream controller connects to the B-ISDN network 5 through the connection 50. To serve 250 MPEG-1 video streams this connection will be an OC-12 (Optical Carrier level 12 [1]) or four OC-3 connections. Communication between host 10 and clients 2 on the network, or with other hosts on the network, shown as dashed lines 6 and 7 respectively in FIG. 1, is mediated by the stream controller 20.

The stream controller subsystem

The stream controller is designed for delivering a large number of continuous media streams from an array of disks to network interface cards simultaneously. The design is optimized for handling large number of low bandwidth I/O transfers (the operating conditions in a video server), as opposed to one or few high bandwidth streams supported in traditional RAID systems optimized for batch processing/time sharing environment.

Figure 3:
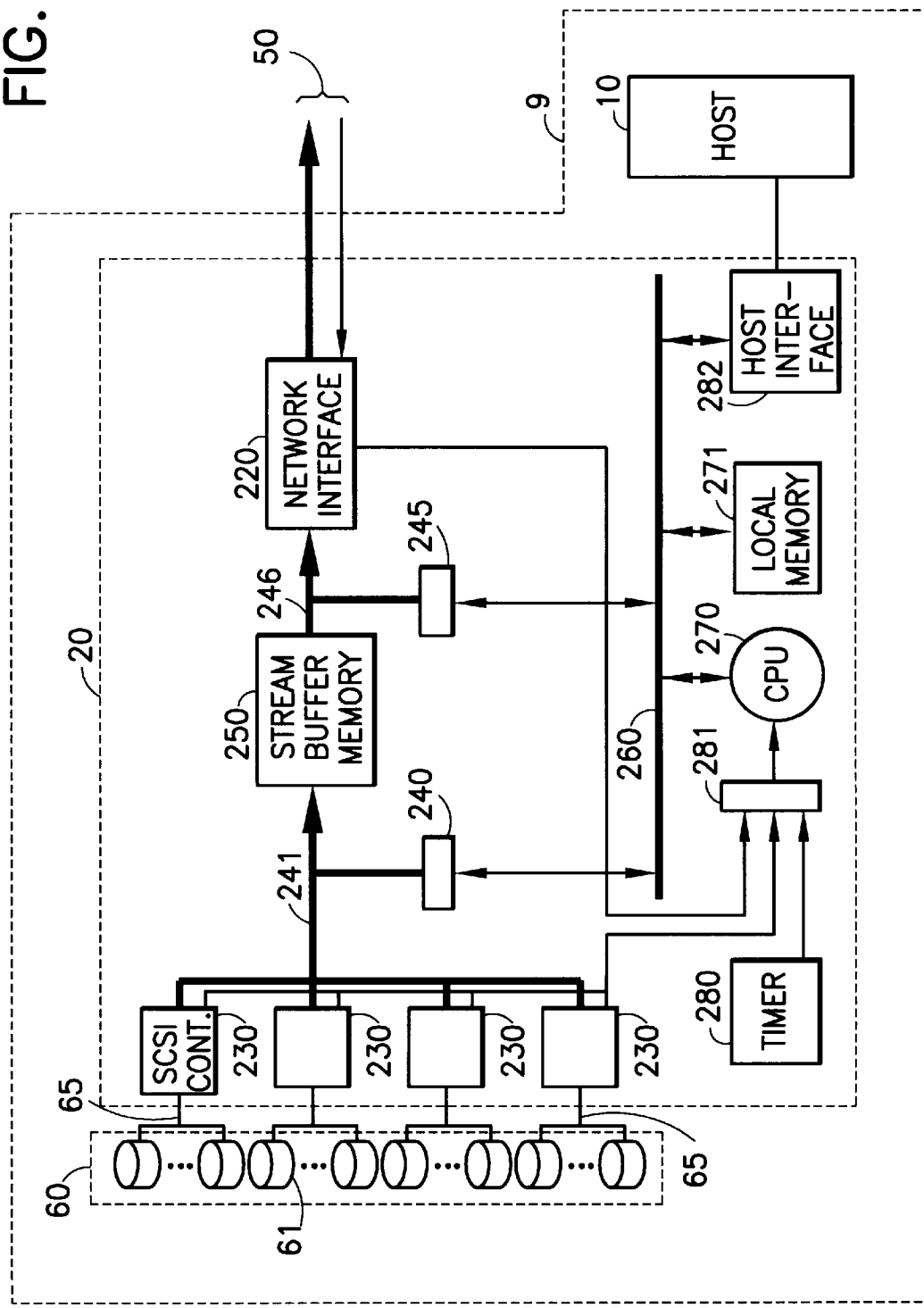
FIG. 3 shows the hardware of the stream controller, which comprises of the stream buffers, Small Computer Systems Interface (SCSI) controller, network interface, and control processor.

Referring to FIG. 3, at the core of the stream controller is the stream buffer memory 250, constructed from semiconductor storage, and connected to two buses 241 and 246. The stream buffer memory is partitioned into multiple stream buffers. Two stream buffers are allotted to each active video stream. Bus 241 also connects to multiple SCSI controller chips 230 [13], and each of the SCSI controller chips in turn generates control signals for the SCSI bus 65 to which multiple disks are attached. Reference [13] is hereby incorporated herein by reference. Bus 246 connects to the network interface logic 220 which handles the B-ISDN connection 50. A real time control processor 270, which is typically an off the shelf microprocessor, is connected to its local memory 271 through the local processor bus 260. The host interface 282 in the stream controller also connects to the local processor bus, and allows transfer of data between the host 10 and the local memory 271, and between the host and stream buffers. The use of timer 280 and register 281 will be described below. Logic 240 comprises of transceivers and arbitration logic to connect buses 260 and 241 when the control processor need to access the stream buffers or the control registers in the SCSI controllers, or when the SCSI controllers need to access local memory 271. Similarly logic 245 allows the control processor to access storage and control registers in the network interface logic 220, and allows the network interface logic to access the local memory 271.

Video data (data units) is stored in the disks of the disk array 60 in format of ATM (Asynchronous Transfer Mode), AAL5 (ATM Adaptation Layer5) packets or SDUs (Service Data Unit) [1]. The data units are pre-packetized before any I/O requests for these data units is handled by the server. The engine ATM/AAL5 CSL (convergence Sublayer) is precomputable, and is precomputed at the time video data is loaded in the disk array 60. The control processor 270 in the central controller instructs the SCSI controllers by means of a script to transfer video data from the disks attached to them into the stream buffers. This script to a SCSI controller comprises of multiple read commands for each of the several disks connected to it, and each read command to a disk specifies the transfer of several ATM/AAL5 packets of video data of a continuous media stream. The SCSI script is written by the control processor 270 into a special area of the stream buffer memory 250 reserved for scripts. Then the control processor gives the SCSI controller 230 the address of the script in stream buffer by writing this address along with other control information in the SCSI controllers control registers. Alternatively, the script could also be stored in the local memory 271. Each SCSI controller indicates the completion of the read commands by generating an interrupt for the control processor by setting a corresponding flip flop in register 281 designated for that SCSI controller. Alternatively, the control processor could also periodically poll the control registers of the SCSI controllers 230 to detect the completion of the read commands issued to them.

From the stream buffer, the ATM/AAL5 packets are read by the network interface logic 220, segmented into 53 byte ATM cells by the network interface logic, the first 5 bytes of any of the cells being the ATM header appended by the network interface logic. The network interface logic 220 also receives a command list from the control processor 270. Each command in the command list specifies the address in the stream buffer of an ATM/AAL5 packet to be transmitted to the B-ISDN network, the size of the packet, and the 5 byte ATM header that should be appended to the ATM cells created from this packet. Similar to the transfer of the SCSI scripts from the control processor to the SCSI controller, the command lists are also written by the control processor into either the stream buffer or the storage in the network interface 220, and the starting address and size of the command list are written into the control memory of the network interface logic 220.

It is assumed that clients have minimal buffering, so that video data must be delivered to the clients at most a few frames ahead of when it is actually played out at the client. To meet this requirement and at the same time to minimize the semiconductor buffer storage needed in the stream controller subsystem, the stream controller retrieves only a small amount of video data, typically a few frames of a video stream, on each disk access. The unit of data retrieved from the disks in one access is further divided into smaller units which are transmitted over the network at regularly spaced intervals to avoid impacting the network adversely by bursty transfers.

Operation of the stream controller subsystem

Figure 4:
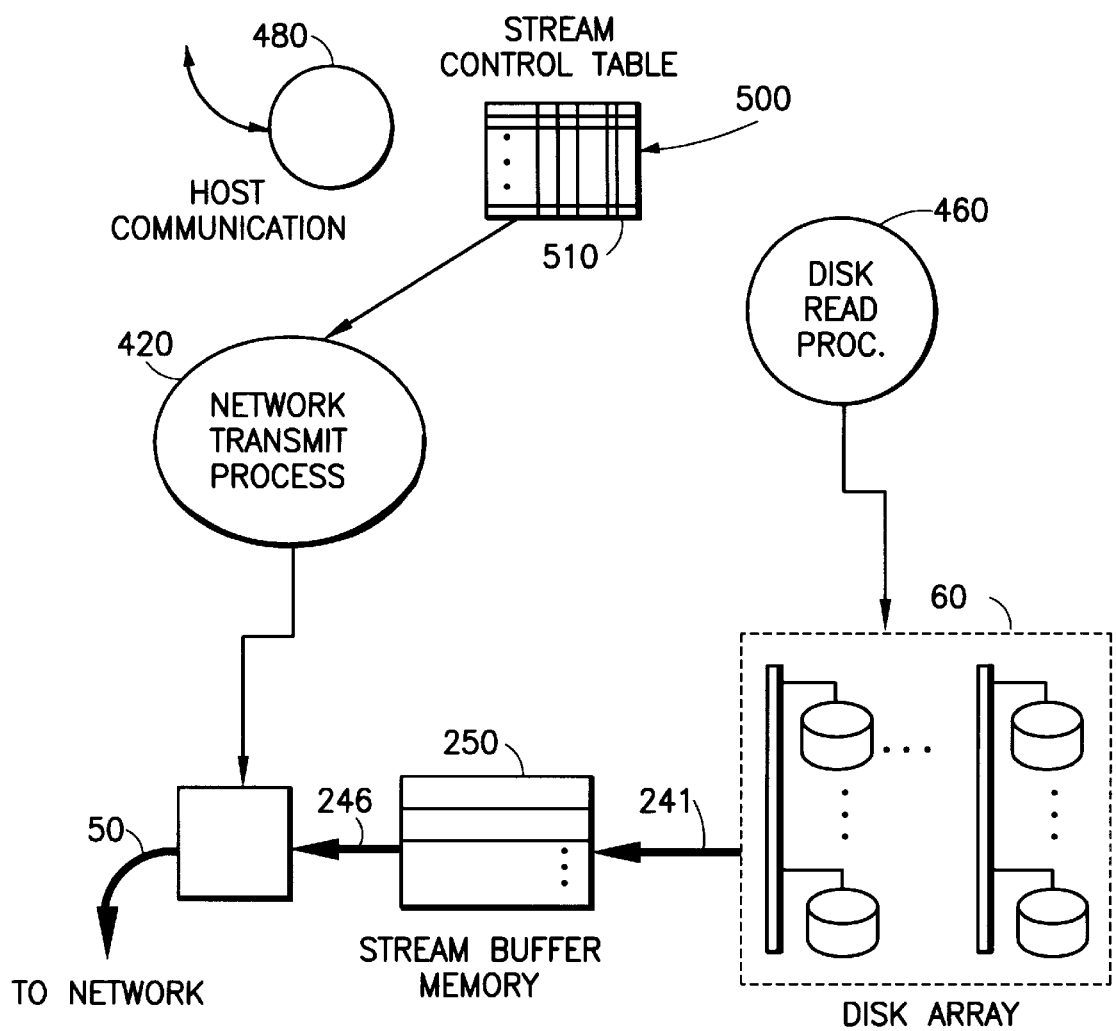
FIG. 4 shows a high level view of the software of the stream controller, i.e., the key data structures and processes.

A High level organization of the software running on the control processor 270 in the stream controller 20 is shown in FIG. 4. It consists of two real time processes, the disk read process 460 and the network transmit process 420, which carry out the delivery of data for the active continuous media streams. These processes are described in detail below. Since data is read from the disks and delivered to the network in small quanta, it is important to control the delay in accessing data from the disk, or in transferring it to the network. Hence the choice of a dedicated microprocessor based subsystem running a real time OS kernel to manage the delivery of continuous media data.

The disk read process 460 is a periodic process, each period being called a disk cycle. In each disk cycle the disk read process issues a read command for each I/O request to retrieve a portion of the data unit requested by the I/O request, thus dividing each I/O request into a sequence of read commands. For a stream of continuous media data, the data retrieved by a read command has the play back time of one disk cycle. The data requested by each I/O request is divided into stripes and stored across the disks in a manner such that the portion of data requested by a read command is for one stripe of data, as described in detail in the next section. The read commands, one for each I/O request per disk cycle, are issued simultaneously by the disk read process 460 in a manner that avoids any particular disk from being overloaded, as described in a latter section. Of course, once the data unit requested by an I/O request has been completely retrieved, the request is deleted in the stream controller, and no further read commands are issued for that I/O request.

A non real time process 480 presents a VCR type interface to the host 10, and in response to the host requests, allocates the stream controller resources to a continuous media stream being created, or releases the resources of a stream being terminated. Not shown in FIG. 4 are the service processes to load data from the host to the disks 60 managed by the stream controller and the processes that allow the host to check various data structures in the stream controller, and to verify the contents of the disks 60. These service processes can be implemented in a variety of ways well known to those skilled in the art.

Figure 5:
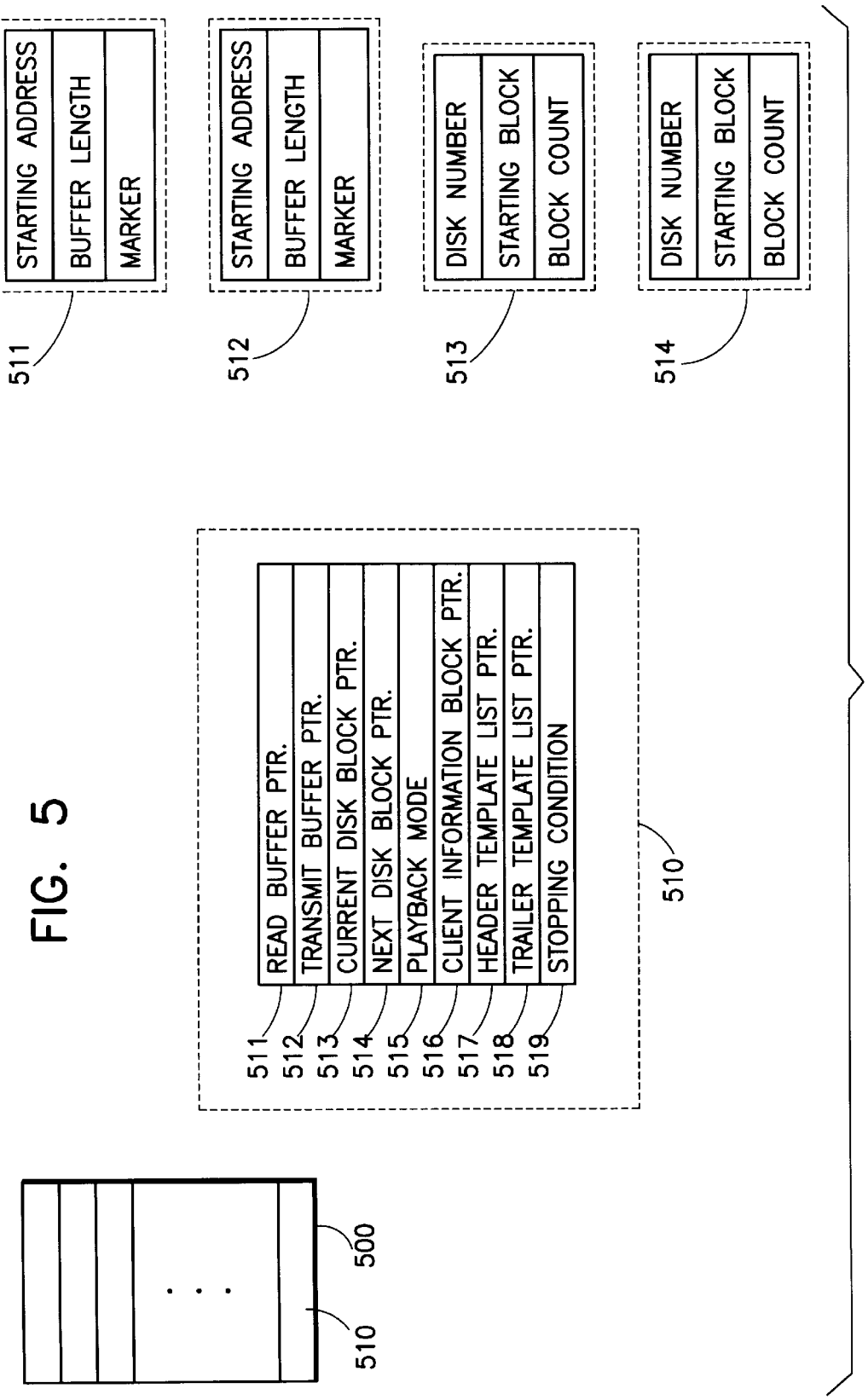
FIG. 5 describes the entries of the stream control table in detail.

The stream control table 500, shown in FIG. 5, is the central data structure in the stream controller. It maintains the state for each active continuous media stream and drives the real time processes for reading disks and transmitting data to the network.

The stream control table 500 has an entry 510 for each continuous media stream, henceforth called stream control block. The stream control block 510 has pointers 511 and 512 to two stream buffers in the stream buffer memory 250, 511 being the pointer to the read buffer which at any given time is receiving data for that stream from the disks, and 512 being the pointer to the transmit buffer which holds the data being transmitted to the B-ISDN network. As shown in FIG. 5, each of the buffer pointers indicate the starting location of the buffer in the stream buffer memory 250, the size of the buffers, the location being currently read/written, and the marker bit indicating for read buffers the completion of transfer from disk.

A second set of pointers 513 and 514 in the stream control block, referred to as stripe pointers, point to the set of disk blocks (or stripe) which must be read next from the disk 60 (actually disk cache as described in detail later) into the read buffer 511, and the set of blocks which must be read by the subsequent read command. The pointers 513 and 514 are comprised of disk number, a starting block number, and block count for the next read command for this stream. The play back mode field 514 indicates whether the stream is in normal play back mode, paused, or in fast-forward/rewind mode. The client information field 516 points to the block of information needed to complete the network protocol processing on the data retrieved from the disk. In the current embodiment it contains the 5 byte ATM header for the cells of the video stream. Fields 517 or 518 are optional fields used to store the pointers to arrays of header and trailer templates stored in control memory 271 when the data stored on the disk is not stored with the network protocol headers and trailers. Their use is described in detail later. Similarly, the last field 519 is also optional specifies the stopping condition for ending the play back of the stream as either the pointer to the last disk block to be played back or the time remaining until the completion of playback.

The interrupts from the timer 280 in the stream controller 20 are used to define fixed interval network and disk cycles. Every timer interrupt starts a network cycle, and every $N^{th}$ interrupt additionally starts a disk cycle. Thus, a disk cycle is N consecutive network cycles. The two real time processes, the disk read processes 460 and the network transmission process 420 are initiated by the timer interrupts which start the respective cycles.

The disk read and the network transmission processes must complete within their respective cycles. This is ensured by a scheduling program together with an admission control policy implemented on the host. The scheduling program is described in a later section in detail. It essentially ensures that the concurrent video streams are started in a manner that prevents any single disk in the disk array 60 from receiving more read requests than it can handle in one disk cycle, and that any particular SCSI bus is also not overloaded in any single disk cycle. The admission control program limits the number of concurrently active video streams based on the stream controller data path limitations and the limitations of the control processor.

Figure 6:
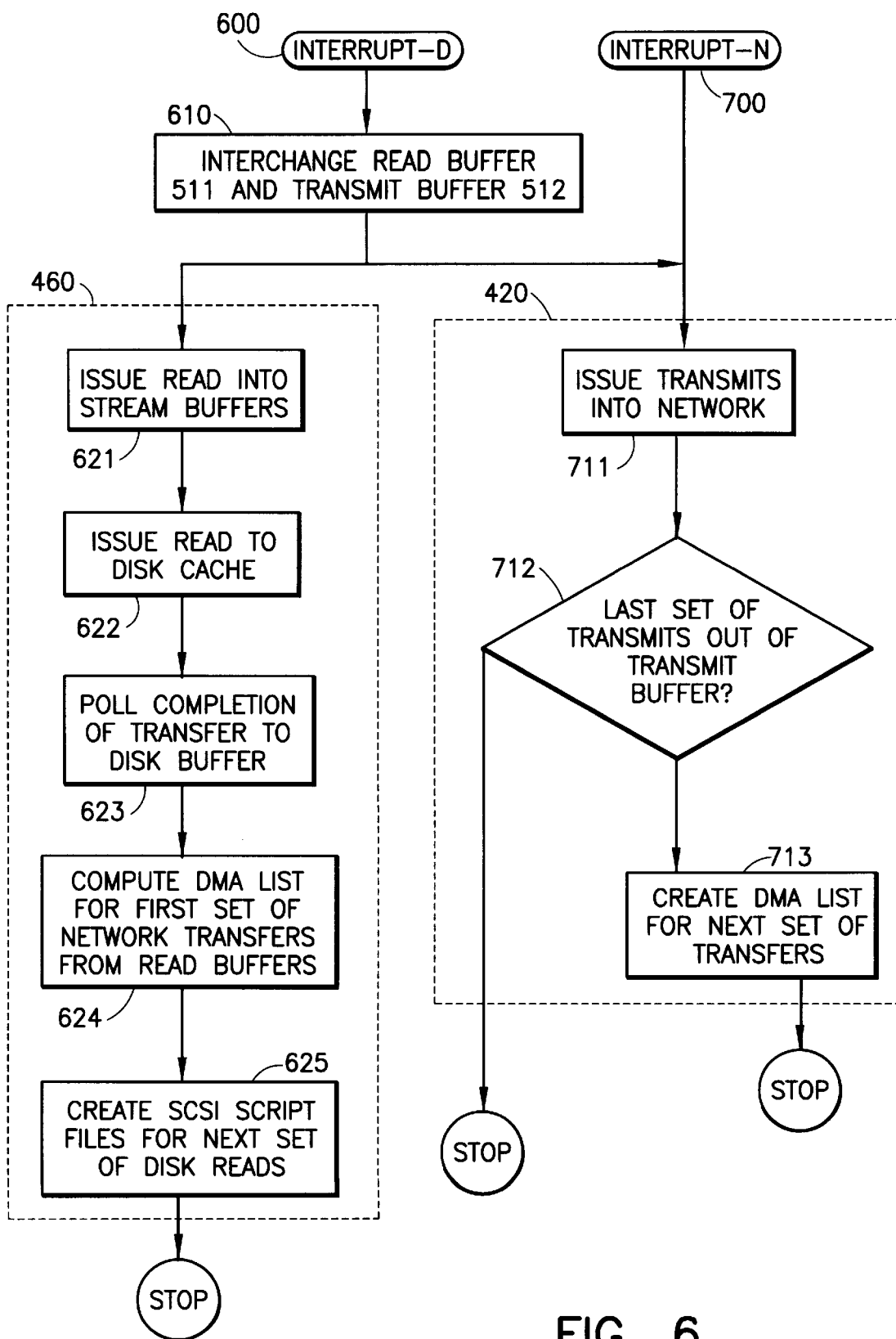
FIG. 6 is the flow chart of the data moving component, which is the real time part of the stream control program.

FIG. 6 shows the core of the stream controller software. A timer interrupt which marks the beginning of a disk cycle starts the disk read process 460 and the network transmission process 420, as indicated in step 600 of the flow chart. This step 600 is labeled interrupt-D to indicate that the timer interrupt is starting both a disk cycle and a network cycle. The first step after receiving interrupt-D is to change the roles of the read buffer 511 and the transmit buffer 512, as shown in step 610 of FIG. 5, because the read buffer finished receiving data from the disk in the previous disk cycle and now holds data to be transmitted to the network. Similarly, all data from the transmit buffer is transmitted before the end of the previous transmit cycle, so it becomes the read buffer to receive data from the disk in current cycle. Then the disk read process 460 and the network transmit process 420, which are described in more detail later, are started concurrently. Timer interrupts which do not start a disk cycle, start only the network process 420, and are indicated as step 700 of the flow chart. This step is labeled interrupt-N to indicate that the timer interrupt is starting only the network process.

The disk read process 460 comprises of 5 steps. At the beginning of the disk cycle in step 621 commands are issued to the disks to transfer the data, which was read from the disk media into the disk caches in the preceding disk cycle, from the disk cache into the stream buffer memory 250. In step 622 we issue additional disk commands to transfer video data, which will be needed by step 621 of the next disk cycle, from the disk (magnetic media) into the disk cache. In both steps 621 and 622, one disk command is issued for each active video stream. In step 623 we check for the completion of step 621. Then in step 624 we compute the DMA (Direct Memory Access) list for the network transmissions in the first network cycle of the next disk cycle. Finally, in step 625 of the disk read process, we create the SCSI script files for steps 621 and 622 of the next disk cycle. Reference [13] describes how to create the SCSI script files.

The network transmit process 420 comprises of three steps. In step 711, DMA commands are issued to network interfaces logic 220 in the stream controller to transmit some data from the transmit buffer 512 of each active video stream into the network. The DMA lists computed in step 625 of the disk read process, or the step 713 of the network transmission process are used for this purpose. The former provides the DMA list for network cycles which are the first network cycle of some disk cycle. The latter provides the DMA lists for network cycle which are not the first network cycle of a disk cycle. In step 712 we check whether the current network cycle is the last network cycle of a disk cycle. If it is not, DMA lists are created by step 713 for network transmissions in the next network cycle. If current network cycle is the last network cycle of a disk cycle, noting further needs to be done by the disk transmission process because the DMA list for the next network cycle will be generated by the disk process of the current disk cycle.

The data read from the disk by a read command must have the play back time of one disk cycle because exactly one read command is issued for each I/O request in one disk cycle. Similarly, the data transmitted over the network for each active stream in one network cycle must have the play back time of one network cycle. The data transmitted for a stream in one network cycle may comprise of one or more ATM/AAL5 packets.

The disk array

In this section we describe the dividing of data in variable size stripes and the storing of these stripes across across the disks in the disk array 60. An overview of magnetic disks (hard disks) is given in Appendix A, and the terms 'cylinder' and 'track' are explained there. Striping over all disks is chosen to avoid a few disks from getting overloaded because of hot movies. By making the playback time of each stripe a predetermined constant, which can result in stripes being of varying size, transient overloading of disks can be avoided as explained later. We also describe the allocation of disk storage in units of cylinders, and the storing of stripes in packed format in each cylinder, as a method of efficiently utilizing the disk storage when storing variable size stripes.

Striping continuous media data over the disk array

Figure 8:
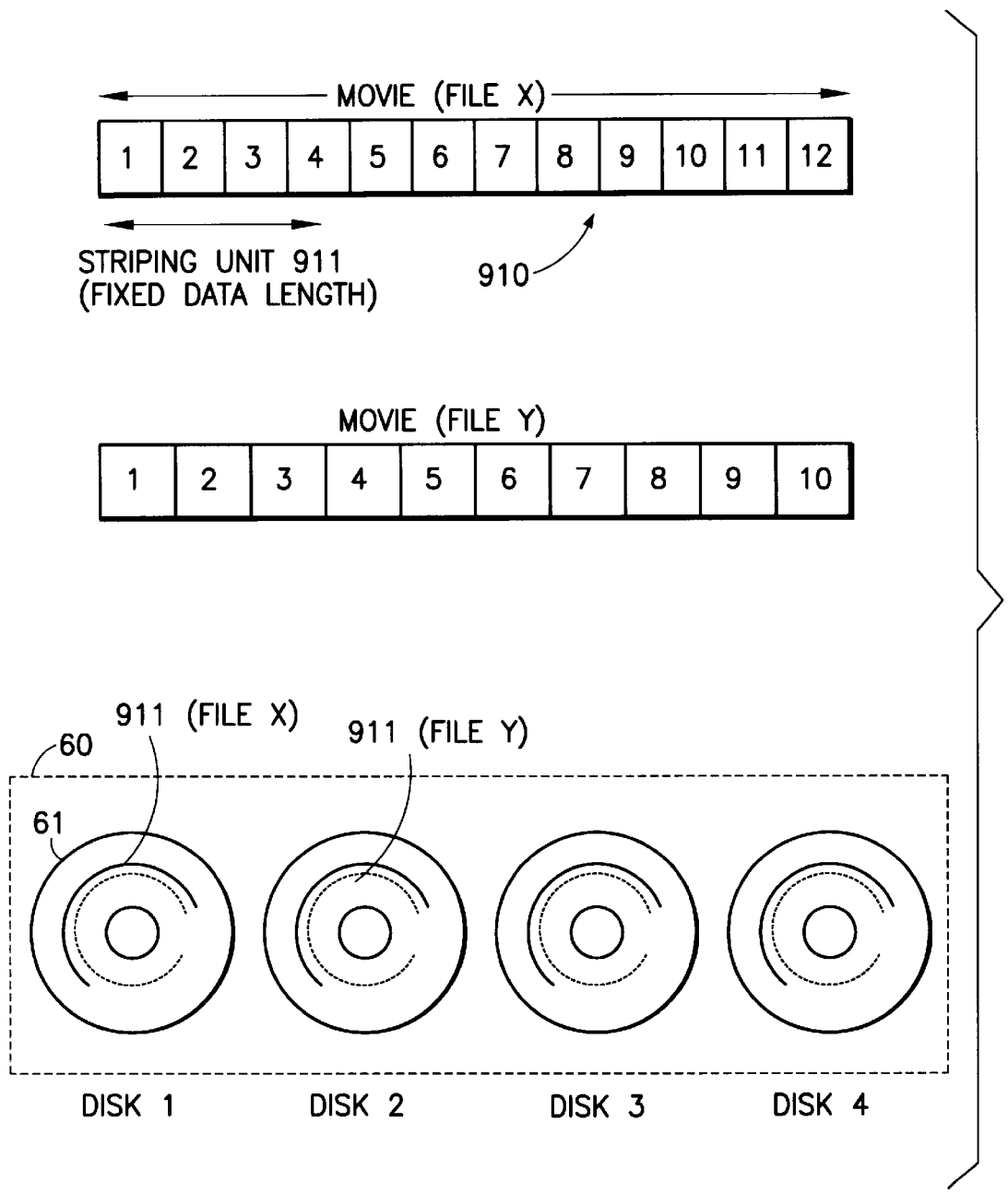
FIG. 8 illustrates the striping of continuous media files across disks in stripes of fixed play out time, where the compression ratio is constant through out any given file but varies between files.

For fixed rate video, the stripe size (the interleave amount) for striping data across the disks depends on the rate at which video data is consumed at the client in playing back the video. One strip of data on the disk has playback time of one disk cycle, and therefore, a read command retrieves a full strip of data. Thus continuous media files having different play back rates will have data interleaved across disks 60 in different stripe sizes. FIG. 8 shows two files 910 of compressed video, with names X and Y. Each file is divided into strips (or striping unit) 911, which contain compressed video that plays at the client for one disk cycle. Individually each video file is compressed to get fixed bit rate in the compressed stream, and therefore all stripes of file X have the same size, and all stripes of file Y have the same size. But file Y has more bits per stripe than file X possibly because the picture size (number of pixels in each uncompressed frame) for file Y is larger than that of file X, or because file Y is compressed at a lower compression ratio to get a better picture quality upon decompression, or both. The lower part of FIG. 8 shows the Video files striped across the disk array 60 consisting of four disks 61. The solid arcs indicate data of file X and the dashed arcs indicate data of file Y, and the stripes of file Y are larger than those of file X.

Figure 9A:
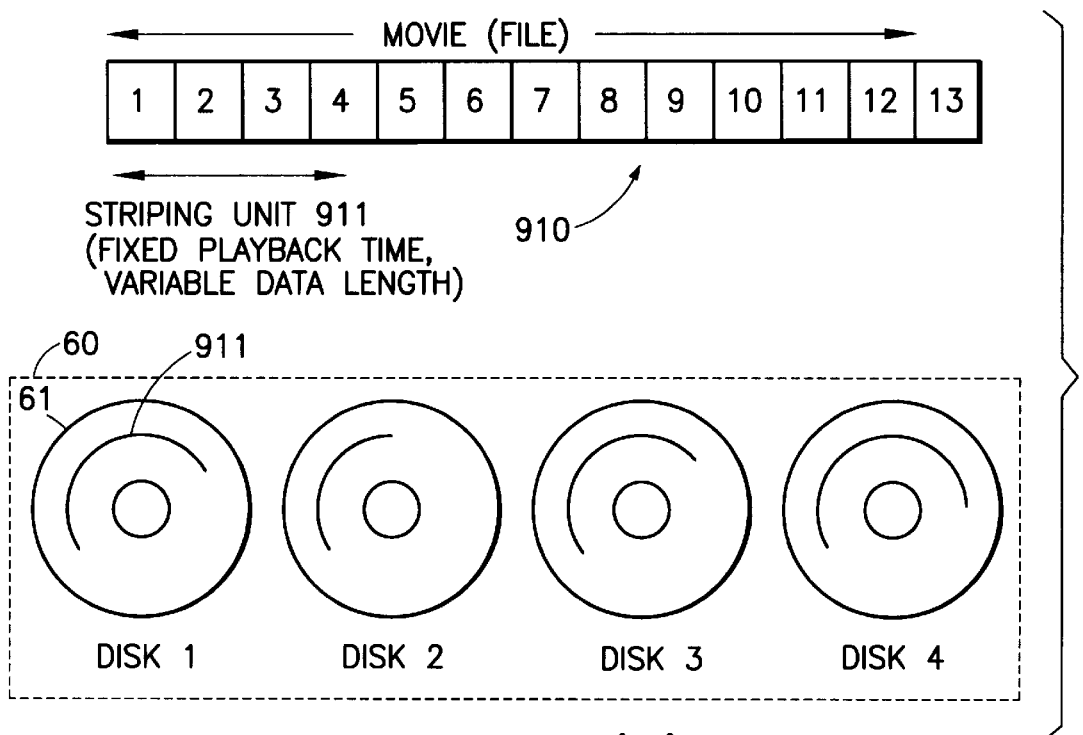
FIG. 9 illustrates the striping of a continuous media file having variable bit rate compression, and therefore, different stripes of the same file have different sizes.
Figure 9B:
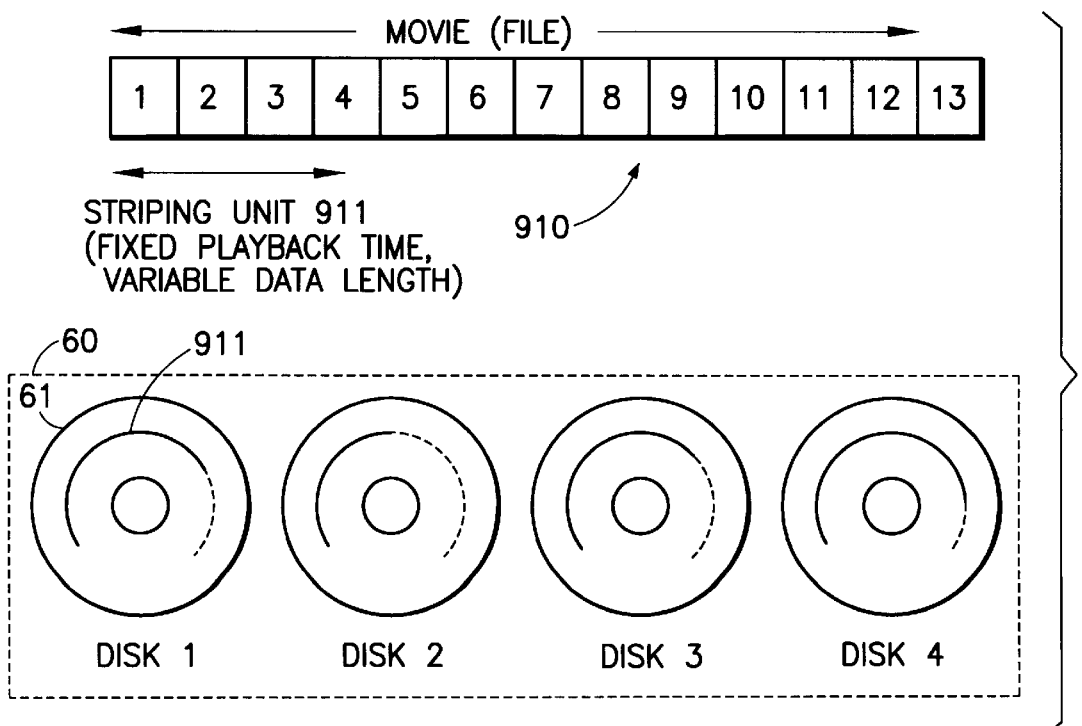

For variable bit rate video, each stripe once again has a fixed play back time equal to one disk cycle, and therefore, different stripes of the same variable bit rate video file will be of different sizes. Successive read commands for the same I/O request now read varying number of data blocks, but they still read the data in whole stripes. FIG. 9a shows a video file 910, which was compressed to produce variable bit rate in the compressed video stream, and the stripes 911 of this file have different amount of data. When storing these stripes of varying size across the disks 61 of the disk array 60, one could use variable number of blocks on the disks to store the different stripes as shown in FIG. 9a, or pad the stripes to require fixed number of blocks on the disk for storing each stripe as shown in FIG. 9b.

The above mentioned striping of video data into stripes which have fixed play back time, is carried out by a software program that can parse the video data and locate the boundaries of each frame. The key routines of such software are available in existing software based video decoders. These routines are available in public domain software for MPEG decompression.

To aid the control processor 270 in finding the location of the next stripe to be accessed by each active video stream, and to locate the packets within the stripe which must be transmitted in various network cycles of the disk cycle in which the stripe is played back, a stripe header is appended in front of each stripe as suggested in [12]. Three fields in the stripe header, collectively known as the stripe pointer, identify the next stripe to be read. The first field being the disk number of the disk 61 in the array 60 in which the stripe is located, the second field is the starting block number of the stripe in the disk identified in the first field, and the third field is either the number of blocks (SCSI disk blocks) in the stripe or the number of the last block in the stripe. Since data is stored on and retrieved from the disks in integral number of blocks, and the size of a stripe containing data for fixed play back time need not be an integral number of blocks, a length field is included in the stripe header to identify the end of the stripe in the last block of that stripe.

Therefore, when the control processor 270 in the stream controller receives a PLAY command from the host 10 to play back a continuous media stream, it requires only the starting stripe pointer and either the last stripe pointer to be played back or the number of stripes to be played back, along with the address of the client to which the stream should be delivered. The pointer to the second and succeeding stripes to be played back are retrieved by the control processor 270 from the stripe header of the preceding stripe when the preceding stripe is retrieved for playback. Thus, the interaction required between the host and the stream controller for the play back of a video stream is minimal.

Since all stripes stored on the disk array have the same playback time, the requirement to play back a stream for a specified time interval can be easily converted to the requirement of playing back a specified number of stripes by dividing the play back interval with the play back time of a stripe.

Disk storage management

In order to use the bandwidth of the disks efficiently, the stripe of data accessed from a disk by a single read command must have the size of roughly one or a few tracks, and this data must be in contiguous blocks of the same cylinder. Stripes from different video files, and even the different stripes of the same cylinder. Stripes from different video files, and even the different stripes of the same video file can have different sizes. Therefore, it is not practical to allocate or reclaim storage on the disk array 60 independently for each stripe as prescribed in the traditional disk storage management methods [2]. If storage was allocated independently for each stripe, the disk would have to be partitioned into fixed size stripes large enough to accommodate the big stripes of a video file, and this would result in inefficient use of storage when small stripes of a video file are assigned to the large fixed size stripes on the disk. Alternatively, the disk could be partitioned into stripes of different sizes, but this would required complex storage management algorithm and still result in storage space fragmentation.

In a video/continuous-media server we can exploit the fact that the continuous media files are very large, and that the storage on the disk array 60 can be allocated and reclaimed for the whole file at the same time, to overcome the above mentioned limitation. A cylinder on a disk is roughly 75 KBytes. 24 cylinders in a stripe group of 24 disks, one from each disk, will have 16 MBytes of storage, which will store video data having playback time of 32 seconds at the play back rate of 16 Mbits/sec. A typical video file will be much larger than 30 seconds, and will require several cylinders on each disk in the stripe group. Therefore, we can use the disk storage more efficiently by allocating disk storage in units of cylinders as explained below.

Figure 10:
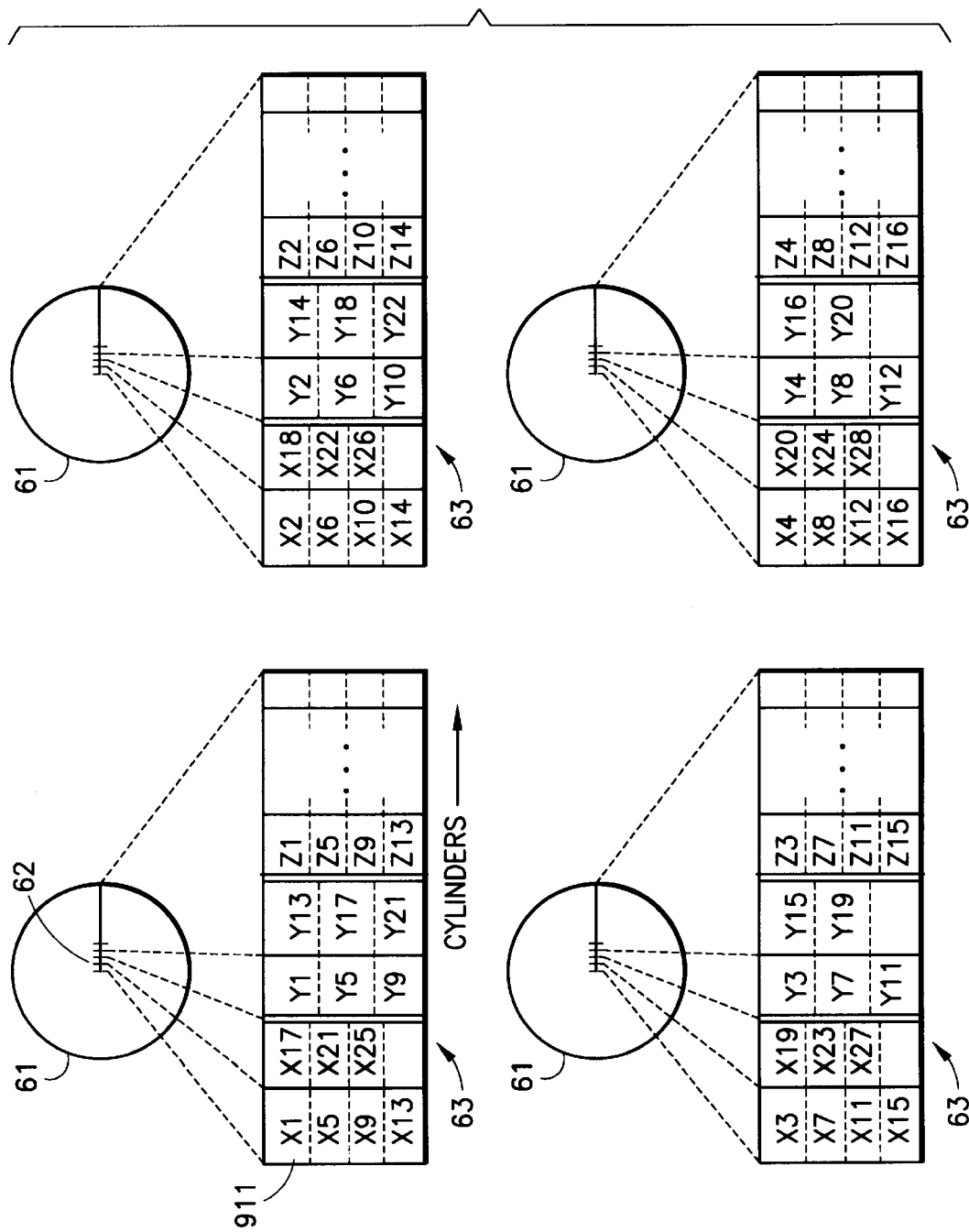
FIG. 10 is an example of three continuous media files, X, Y, and Z, stored on an array of four disks, where X and Z are compressed at identical fixed rate, and Y is compressed at a lower fixed rate.

Disk storage is managed by allocating a set of cylinders in identical locations on all disks to a video file, and storing the stripes of the video files in these cylinders in packed format. FIG. 10 shows a disk array 60 consisting of four disks 61. The storage on the disks is divided into cylinders 62. A cylinder corresponds to the storage accessible on the disks from a fixed position of the read/write head or equivalently the disk arm, and has roughly 500 KBytes to 1 MByte of storage. Three movies X, Y, and Z are shown to be striped across all four disks. Tables 63, one for each disk, illustrate how the striping is done. Entry Xn indicates the $n^{th}$ stripe of movie X. The columns of table 63 represent cylinders and show the stripes stored in them. The first two cylinders store the stripes of movie X, the next two store the stripes of movie Y, and the stripes of movie Z start getting stored from the next cylinder.

The stripes of movie X have the same play out time as the stripes of movie Y even though the stripes of movie Y are shown to be bigger, i.e. having more data, then stripes of X. Hence a cylinder of the disks stores more stripes of movie X then Y. As explained earlier, the stripes of movie Y can have more data than the stripes of X despite both being for the same play back time, because of movie Y being compressed at a lower compression ratio or having a larger picture size. All stripes of a movie in FIG. 10, say movie X, are shown to have the same size, and hence the same number of stripes of that movie appear in each cylinder storing that movie, except for the last cylinder. But if the movies were compressed at a variable bit rate, different stripes of a movie would have different sizes, and different number of stripes of a movie would fit into different cylinders of the disk.

The tables 63 are actually not maintained for the separate disks, and are shown in FIG. 10 only to explain the placement of stripes on the disks of the array 60. Instead a table called the Movie Placement Table (MPT) is maintained in the Host 10 for each movie. This table stores the disk number and the location on the disk of each stripe or of a set of stripes repeating at regular intervals. Additionally, each stripe of a movie stores the location of the next stripe of that movie in its stripe header.

In our preferred embodiment video data is striped across all disks 60 connected to the stream controller. The preferred stripe group (group of disks over which a file is striped) will comprise of disks evenly distributed across all SCSI buses 65, having an aggregate sustained bandwidth equal to the maximum sustained bandwidth at which data can be moved from the SCSI buses to the network through the stream controller. This will result in stripe group size significantly larger than that of typical RAID systems which have 5 or 9 disks in a strip group. Having large stripe groups does increase the delay in starting a new stream in a very heavily loaded system, but at the same time reduces the probability of rejecting the request for starting a new stream due to hot spots appearing on the stripe group being accessed by the new request. The hot spots refer to the situation where a small stripe group has the popular movies stored on it, and these movies are requested by more streams than the maximum number of streams supportable by the sustained bandwidth available from all the disks in the small stripe group. By choosing the stripe group size to be the preferred stripe group size defined earlier or larger, rejection of new requests for popular movies due to the hot spot phenomenon is avoided.

If the continuous media files are on average not large enough to occupy a few cylinders on all disks of the stripe group of a large size as suggested above, the size of the stripe group can be reduced. Alternatively, the disk storage can be allocated in units less than the size of a cylinder, but still much larger than blocks or tracks. The disadvantage of reducing the size of the stripe group is that now the small stripe group can get overloaded much more easily, causing new requests to that stripe group to be blocked. The disadvantage of reducing the unit of disk storage allocation is that disk storage is used inefficiently. If the size of the continuous media files is truly large, the unit of storage allocation can be chosen to be multiple cylinders. Also, if the storage was allocated at the same time for all the media files stored on the disk, and the popularity (access frequency( of these files was known apriori, one could assign contiguous cylinders to each file, and start allocating the cylinders to files in the order of their popularity starting from the center track (in the middle of the innermost and the outermost track), assigning cylinders closest to the center track first. This would reduce the average seek time.

Scheduling the read access to the disk array

In the preceding three sections we described the stream controller hardware and its operation. We described how video data for a stream was stored on disk array 60, and from there transmitted to the B-ISDN network over connection 50 without going through the host 10. In this section we describe the use of schedule table to generate disk read commands in step 625 of the flow chart in FIG. 5, which results in low overhead and prevents any disk in array 60 from getting more read requests than what it can complete in a disk cycle.

Since a video vile is striped across all disks with each stripe containing data for a fixed playback time, and all streams access all disks in the same order, the active continuous media streams move from one disk to the next at the same speed. Thus, all active continuous media streams maintain their relative position with respect to each other. For example, if at some give instance stream i was accessing disk X and stream j was accessing disk Y, in the next disk cycle stream i will be accessing disk (X+1) mod N and stream j will be accessing disk (Y+1) mod N, and K disk cycles later stream i will be accessing disk (X+K) mod N and stream j will be accessing disk (Y+K) mod N, where N is the number of disks across which the video data is striped. In short, streams i and j will always be X−Y disks apart.

Figure 7:
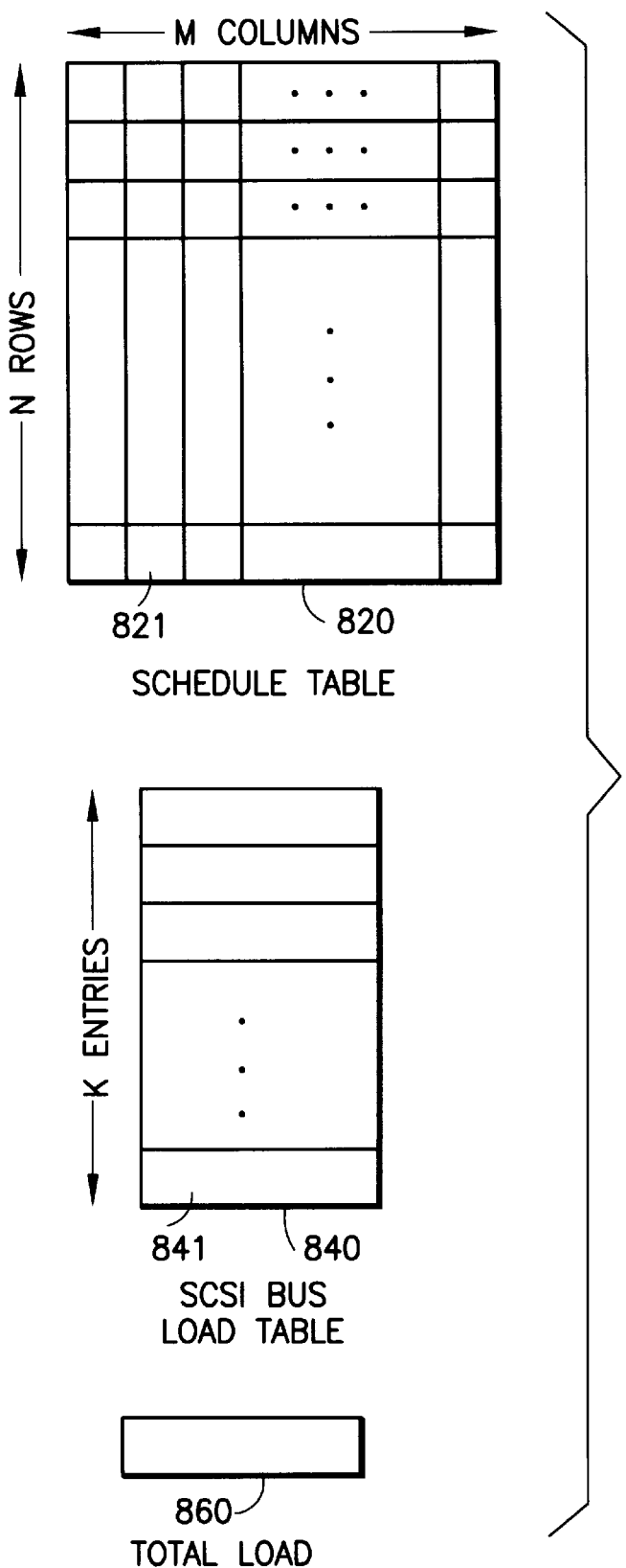
FIG. 7 is the schematic of the schedule table, the SCSI bus load table and the total load table.

To execute step 625 in the flow chart of FIG. 6 efficiently and to prevent any disk from getting overloaded in any disk cycle we use the schedule table 820 shown in FIG. 7. It is a table containing N rows and M columns, where N is the size of the stripe group (number of disks across which the files are striped), which in our case is the size of the disk array. M is the maximum number of requests that a disk can complete in a disk cycle. Each row in the schedule table represents the set of streams that access the same disk in every disk cycle. If there are multiple strip groups in the disk array, there is a schedule table for each strip group. Each cell 821 in table 820 can have a stream identifier or a null value.

The disk cycles are numbered using a modulo N counting system. We will refer to these numbers as labels. Row i of the schedule table identifies streams that will access disk i in disk cycles labeled 0, and in general disk k in disk cycle labeled (k−i) mod N. In addition to the schedule table the disk controller also maintains a SCSI bus load table 840 with entries 841, one entry for each SCSI bus connected to the stream controller, and a total load counter 860. The number of entries in the SCSI bus load table is equal to the number of SCSI buses connected to the stream controller. Entry j in the SCSI bus load table indicates the load on SCSI bus j in disk cycles labeled 0. If N, the number of disks in the disk array 60, is divisible by K, the number of SCSI buses, then entry j in the load table 840 also indicates the load on SCSI bus (j+k) mod K in disk cycles labeled k. The total load counter 860 is simply the number of active continuous media streams. The number of cells in the schedule table can far exceed the maximum number of streams allowed by the stream controller or the size of the stream table 500 because the former only indicates the maximum number of streams that can be supported by all the disks (N×M of them in our case) not taking into account the bandwidth limitations of the SCSI buses or the stream controller data paths, or the processing limitations of the stream controller, which determine the maximum number of video streams allowed or the stream table size.

FIG. 11 shows four video streams 920 being played from the stream controller 20. Video streams S2 and S4 are of the same movie Y started at different times, while streams S1 and S3 are of movies X and Z respectively. The top part of the figure shows the progression of time which is divided into disk cycles. As mentioned previously, if N consecutive network cycles (see above) comprise a disk cycle, then every $N^{th}$ interrupt 285 from the timer 280 starts a disk cycle as shown in FIG. 11. It is assumed that the disk array has four disks numbered from 0 to 3, and hence the disk cycles are also labeled with numbers from 0 to 3, repeating every four cycles. The stripes of the movies are also numbered starting from 1, and FIG. 11 also shown the number of the stripe of each stream playing in each disk cycle. Stripe i of each movie is stored in disk (i−1) mod 4.

Figure 12A:
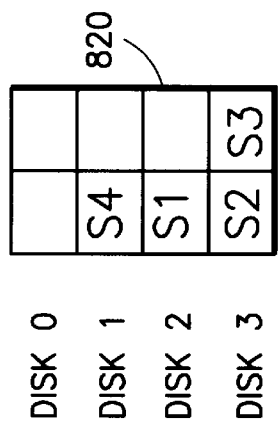
FIG. 12a shows the schedule table for the streams shown in FIG. 11.

The schedule table for the four streams of FIG. 11 is shown in FIG. 12a. If a stream starts playing in a disk cycle labeled s, i.e. stripe 1 of the movie is retrieved from disk 0 in cycle labeled s, then the stream will always access disk 0 in cycle labeled s and access disk (4−s) mod 4 in cycle labeled 0. Hence an I/O request (for a video stream) can start in cycle s if there is an empty cell in the schedule table in row (4−s) mod 4, and as described below, writing the stream identifier in this empty cell starts the play back of the video stream. By finding an empty cell in row (4−s) of the schedule table we determine that disk 0 has additional bandwidth to complete a read command in cycles labeled s. This automatically also determines that disk 1 will have additional bandwidth to complete a read command in all cycles labeled (s+1) mod 4, and in general disk i (0≦i<4) will have additional bandwidth to complete a read command in all cycles labeled (s+i) mod 4. Furthermore, by writing the stream identifier of an I/O request (stream) in this empty cell, we issue the the first read command of that I/O request (stream) to disk 0 in the first cycle labeled (4−s) encountered after the writing of the stream identifier. The first read command is issued to disk 0 because the initial setting of the next disk block pointer 514 is for strip 1, and therefore, is pointing to disk 0.

If the stream does not start from strip 1 of a movie, but starts from an arbitrary stripe b in cycle s, then disk (b−1) mod 4 is accessed in cycle labeled s, and hence disk ((4−s)+(b−1)) mod 4 will be accessed in cycles labeled 0, and an entry should be made in that row of the schedule table. The dashed box 810 in FIG. 11 shows the stripes of the four streams accessed simultaneously in a disk cycle with label 0. It can be readily seen that the row of the schedule table in which the stream is entered in FIG. 12a is the same as the same as the disk accessed by the strip of that stream in box 810.

Figure 12B:
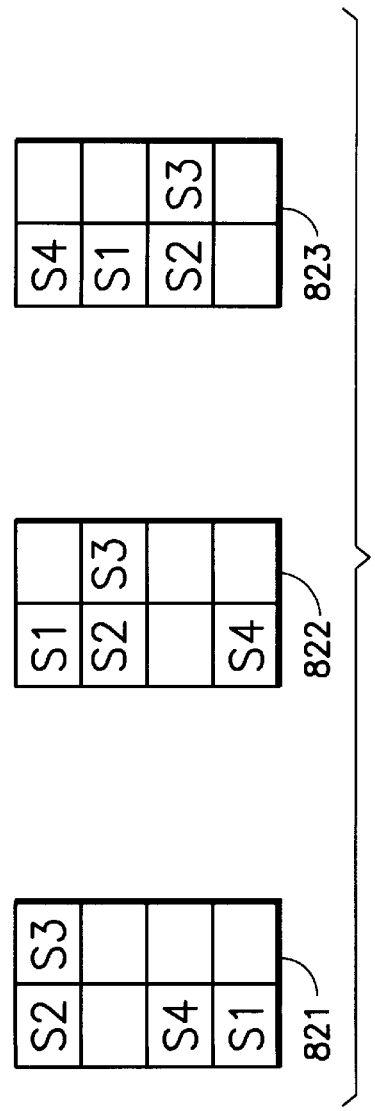
FIG. 12b shows the schedule for accessing disks in the disk cycles labeled 1, 2, and 3.

The schedule table in FIG. 12a provides the stream controller the list of streams that access each disk in cycle labeled 0. The streams which access a disk d in cycle labeled 1 are the same as those which accessed disk d−1 mod 4 in cycle labeled 0. Tables 821, 822, and 823 in FIG. 12b show the streams accessing each disk in cycles labeled 1, 2, and 3. However, the tables 821, 822, and 823, need not be maintained in the stream controller because they are row wise cycle shifts of the table 820.

Operation of the interactive multimedia server

When a client 2 desires to receive a video stream (e.g. a movie) he sends a client request for that movie to host 10 of the server 9. If the requested movie is stored on the disks 60 of the stream controller 20 in the server in pre-packetized format, the host 10 send an I/O request (also referred to as a PLAY command) to the stream controller 20.

The stream controller starts playing a stream in response to the PLAY command by entering the stream identifier in the stream control table. Prior to the issue of PLAY command, a CREATE_STREAM command must be issued by the host to the stream controller to allocate the read and transmit buffers in the stream buffers memory 250, and to set up the stream control block 510 for the new stream. After completing the processing of the CREATE_STREAM command, the stream controller returns the stream identifier to the host, which the host uses in all subsequent commands sent to the stream controller for this stream. The stream identifier also indexes the entry for this stream in the stream control table 500.

The other commands supported by the stream controller are the PAUSE and DELETE_STREAM, the former does not relinquish the resources of the stream controller allocated to the stream identified in it while the latter does. In addition to the four VCR interface commands already described so far, READ and WRITE commands allow the host to load data into the disk array 60, and read the data back to verify its integrity.

The three key parameters of the PLAY command are the stream identifier, the initial value of the disk block pointers to initialize the stream control table entries 513 and 514, and a stopping condition specified as either the pointer to the last disk block to be played back or the number of disk cycles remaining in the completion of the playback. These parameters thus complete the entries in the stream control block 510, which were not completed by the CREATE_STREAM command for that stream. When the stopping condition is reached during the playback of a stream, the stream controller signals this completion of the host, which can then either delete the stream using the DELETE_STREAM command, or issue a new play command with a new stopping condition to play an additional section of that stream.

When the host issues a play command to the stream controller to start playing a stream, the stream controller searches the schedule table 820 for a row 821 which has an empty cell in it. This search could be tuned to equalizing the number of cells occupied in each row, or minimizing the delay in starting the playback of the stream. Note that if the first disk block read by a stream is on disk d, and the request for this stream is allotted to row r of the schedule table 820 in cycle labeled c, then the latency in starting the playback of the stream is (d−r−c) mod N, where N is the number of disks. The stream accesses disk r in cycle labeled 0, and thus accesses disk d in cycle labeled (d−r) mod N. Hence the delay from cycle labeled c is (d−r−c) mod N.

We will assume that the processing of the play command will complete in a single disk cycle. However, those skilled in the art will readily appreciate that routines for implementing all host commands including the PLAY command can be written in a manner that if they are suspended by the timer interrupt which starts a new disk cycle, they will complete correctly in the next or still subsequent disk cycle.

Alternative Embodiments

In the preceding section we described the preferred embodiment for our invention. However, those skilled in the art will readily observe that the invention can be practiced by several variations of the preferred embodiment as well. For example, the control processor 270, the local memory 271 and the host interface 282, could be connected differently than the shared bus scheme. In this section we will describe some alternatives to our preferred embodiment which may be suitable for different application environments.

Having read commands access multiple disks

In our preferred embodiment, a read command accessed a strip of data which was stored on a single disk, and had the play back duration of one disk cycle. If very low bandwidth disks were used, or the data was retrieved by the continuous media streams at very high rates, one disk may not have sufficient bandwidth to retrieve a full stripe of data within a disk cycle. This problem can be solved by replacing each disk of our preferred embodiment by a RAID system [8] having the multiple disks needed to meet the bandwidth requirement. A strip of data accessed by a read command will now be further divided internally by the RAID system controller and striped across the set of disks in the RAID system. One could further optimize this system by merging the RAID controller function in the control processor 270.

Alternatively one could view the disks in the preferred embodiment as logical disks, each logical disk being a set of physical disks. A read command accesses a strip of data, which has the play back duration of one disk cycle, from a logical disk. The stripe of data associated with the logical disk is further divided into smaller stripes and stored across the physical disks of that logical disk. The control processor partitions the read command issued to the logical disk into disk commands for the physical disks of that logical disk so that the data retrieved from the physical disks aggregates to the stripe requested from the logical disk by the read command.

Splitting the disk access and the and network transmit functions

Figure 13:
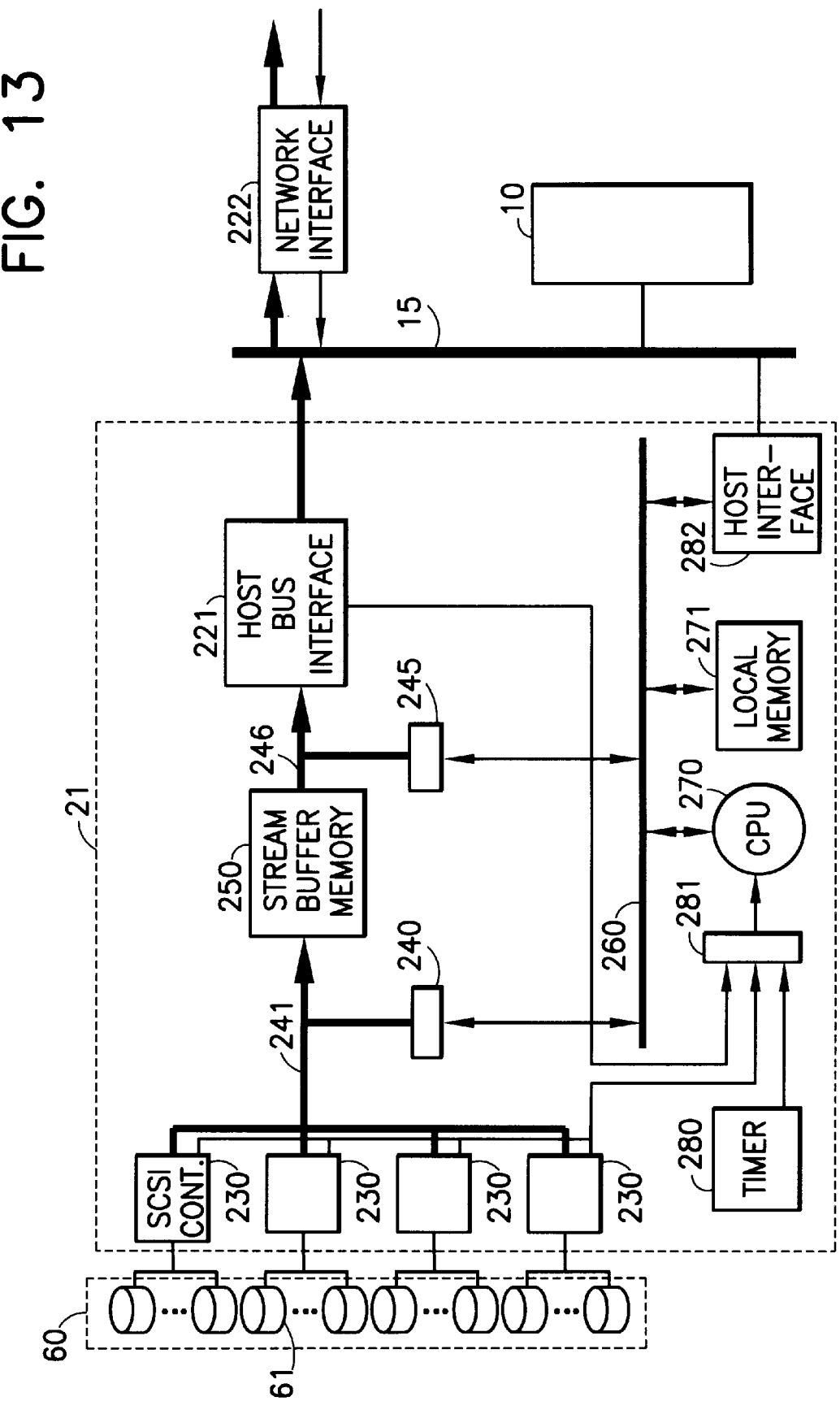
FIG. 13 shows a variation of the stream controller without the network interface, where the network interface logic connects to the host bus separately and receives prepacketized data from the stream buffer memory over the host bus.

The stream controller 20 of the preferred embodiment can be modified to transfer data from the stream buffer memory to the network interface logic over the host processors I/O bus 15. This implementation of the stream controller 21, with an interface 221 to the host bus 15, and with a modified network interface 222, is shown in FIG. 13. The advantage of this configuration is that the network interface card 222 can now be changed to connect the server to different networks without requiring the replacement of stream controller 21.

Multiple stream controller cards connected to one host

Figure 14:
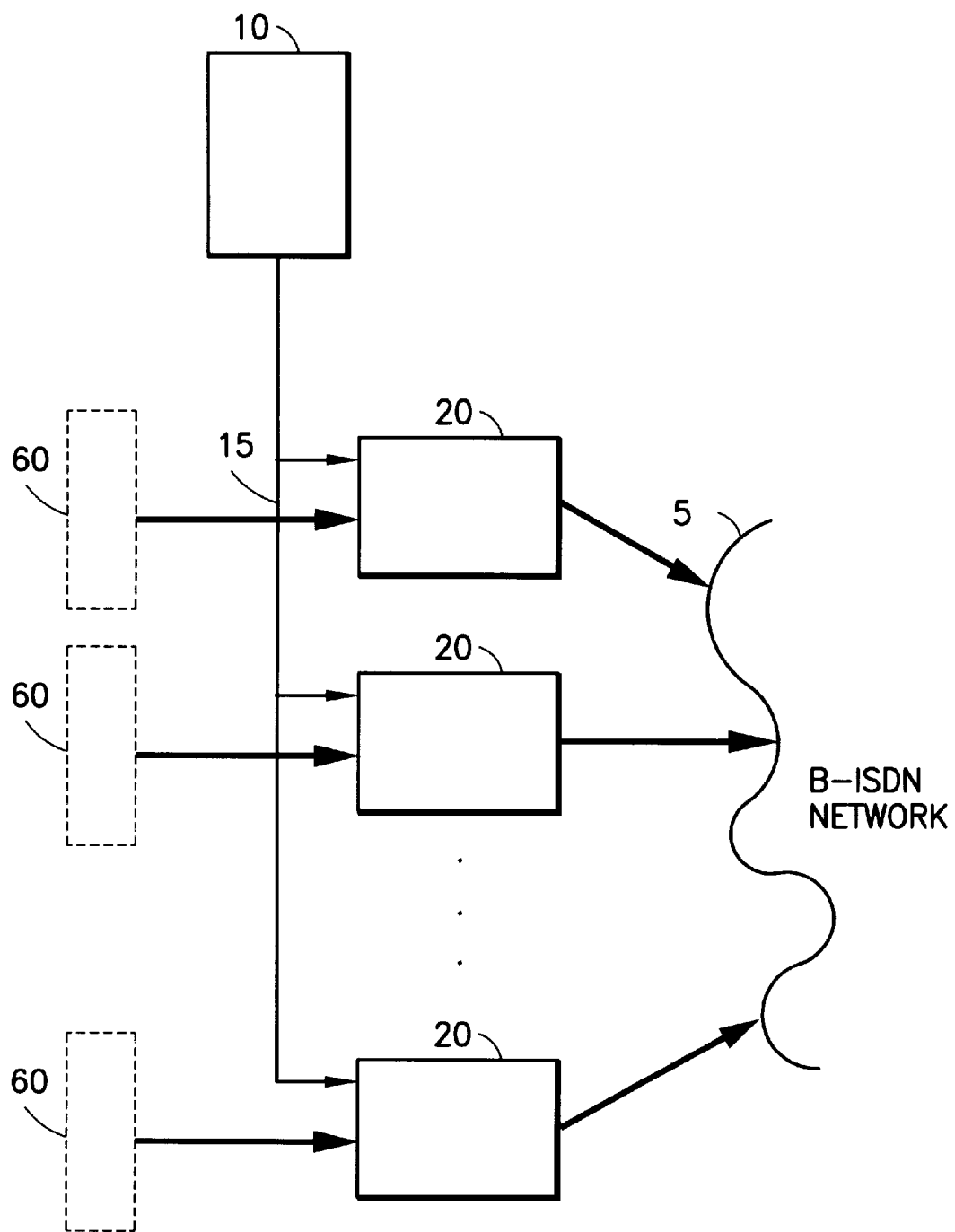
FIG. 14 shows a multimedia server with a single host controlling multiple stream controller cards.

In our preferred embodiment we connected only one stream controller 20 with a host 10. As explained earlier, the host's involvement in the delivery of video streams is minimal, especially if the clients request long streams. Therefore a host with reasonable performance will be significantly under utilized. Those skilled in the art will readily observe that the host 10 can be connected to multiple stream controllers 20, as shown in FIG. 14, through the host's I/O bus 15. In this case, each stream controller is connected to its own independent disk array 60, and the striping of a continuous media file is restricted to the disks connected to the same controller. When a clients requests a video stream, only one stream controller gets involved with the delivery of that stream to the client. While a file is stored on the disks of the same stream controller, multiple copies of the same file can be stored on the disk arrays of different stream controllers, each copy being stored in its entirety in one disk array.

Offloading local processor computations using state machines

The number of streams that can be simultaneously supported by the stream controller 20 is constrained by two limits. The first is the bandwidth from the disks to the network through buses 241, 246, 50, the stream buffer memory 250, and the network interface 220. The second is the capacity of the control processor 270 to compute the disk read and network transmit requests, and complete the protocol information in the pre-packetized data for all streams. When designing stream controllers that can support a large number of concurrent streams, while it may still be possible to design high bandwidth data paths from the disks to the network, it may be difficult to find a suitable control processor 270 (cheap microprocessor) which can compute the disk read and network transmit requests and the protocol information for all streams in the allotted time. However, those skilled in the art will readily note that these computations are very simple in nature, and can be off-loaded from the control processor to dedicated state machines. The state machine for completing the protocol information in the pre-packetized data can be part of the network interface 220.

Handling disk failures

The failure rate of disks has dropped dramatically over the last decade. Furthermore the disk array 60 in our preferred embodiment is not expected to be archival storage in nature, but is used as a temporary storage for pre-packetized data. Therefore we did not address recovery from disk failures in the preferred embodiment. However, those skilled in the art will readily realize that the well known techniques for recovering from the failure of a disk or two in RAID systems can be employed in the stream controller 20 of the preferred embodiment as well. A parity disk can be added to each group of few data disks, and parity is computed on a block by block basis for all disks in the parity group.

Supporting different network protocols

In the preferred embodiment we used an ATM network and consequently chose to store the data on the disks ATM/AAL5 packets. The ATM/AAL5 packets comprise of a payload and a 8 Byte trailer, but no packet header. Those skilled in the art will readily observe that different networks and networking protocols can be used instead, and the data will be stored on the disks as packets with headers and trailers conforming to the network protocol in use. For example, instead of the ATM/AAL5 packets, one could store UDP (User Datagram Protocol) [14] packets if the network 5 was the Internet.

The ATM/AAL5 packets have no header and all field of the trailer are computable when data from a file is segmented into the ATM/AAL5 packet payload. Thus we stored fully precomputed packets on the disks. However, for other protocols all fields of a packet header may not be computable when the packet is being stored on the disk. For example, when storing UDP packets on the disk, the Destination Port field will be unknown (assuming that multiple applications from a client could be accessing streams simultaneously on different UDP ports, or the same application could be accessing multiple streams). The length field is computable on the other hand. The checksum field is not computable because in UDP checksum is computed over the data payload, the UDP header, and the IP (Internet Protocol) pseudo header. The source port field of the UDP header may or may not be known depending on the implementation of the higher layers.

Computing the checksum in the UDP header requires the knowledge of the destination address in the pseudo header, which is not known at the data is stored on the disks. However, the checksum field can be computed partially over the data payload and the known fields of the UDP header and the IP pseudo header, and the partial results can be stored with the packets on the disks, and at the time of delivering a packet to a client, the checksum calculation can be completed with the knowledge of the missing fields in the UDP header stored in the disks and the pseudo header. The advantage of computing the checksum partially is that at the time of delivering the data to a client, the overhead of computing the header is greatly reduced, and this overhead is not incurred repeatedly as the same data is delivered to multiple clients.

Therefore, generally a network protocol header or trailer will have some fields which at the time of storing the packets on the disks are precomputable, some which are partially computable and some which are not computable. We store these headers/trailers with the precomputable fields set, and partial results stored in the corresponding fields or appended to the packet, and the not computable fields unspecified. We will refer to these packets as the partially precomputed packets. The data stored as fully precomputed packets or partially precomputed packets is referred to as prepacketized data. When the data stored on the disk consists of partially computed packets the control processor 270 can compute the missing fields and complete the computation of the partially computed fields, after the data is read into the stream buffers and prior to its transmission over the network, to form complete packets (network packets). Alternatively, if the network interface 220 has sufficient intelligence such as an embedded controller, each command in the command list issued by the control processor 270 the the network interface 220 can include information which can be used by the network interface logic to complete the headers/trailers of the packets being transmitted to the network by that command.

Network protocols have multiple layers. In our preferred embodiment, the stream controller was responsible for supplying the headers and trailers of the ATM layer and the ATM adaptation layer (ATM/AAL5). The header for the ATM layer was constructed on the fly in the network interface 220, while the trailer for the ATM/AAL5 was stored with the packet payloads in the disks. In fact some protocols can have many more layers, and often it would be desirable to precompute the headers and trailers of several of these layers prior to storing the continuous media data on the disk array 60. Each payload of user data can have multiple headers, corresponding to the different layers of a network protocol, prefixed in front of it, and multiple trailers similarly concatenated at the end. For example if the internet protocol suite was used [14], one could store packets comprising of the payload, the UDP header, and the IP header, because several fields in both headers are precomputable. In the UDP header the length field is precomputable and the checksum is partially precomputable, while in the IP header, source address, protocol, time to live, sequence number etc. are precomputable. IP and UDP have no trailers.

The packets (protocol data unit) may have significantly different sizes at different layers of the network protocol to optimize the performance of each layer independently. In this situation, one would first form the packets of the higher layer of the protocol by concatenating the partially or fully precomputed header and trailer of that layer. Then the packet of this higher layer are fragmented into several smaller payloads for the next lower layer of the protocol, when the lower layer requires small payloads, and the partially or fully precomputed header and trailer of this layer are are concatenated to the payload received from the higher layer. This step could be repeated for several protocol layers. If the lower layer of a protocol accepts larger payloads than the higher layer, then instead of fragmenting the pre-packetized PDUs produced by the higher layer before it is passed to the lower layer, one would combine several such PDUs to form a larger payload (SDU) for the lower layer.

If the header/trailer fields of the network packets are essentially identical for all packets of the same I/O request, or if these fields can be computed by the control processor using very few instructions, it is not essential to store the header and trailer fields with the packet payloads. An array of header/trailer templates can be maintained in the local memory 271 of the stream controller for each I/O request, the number of templates in the array being equal to the number of packets transmitted over the network in each network cycle. The control processor then the computes the fields in the templates of an array which differ between the packets of the I/O request corresponding to that array. The network interface 220 is instructed to read the payload of the packets from the stream buffer memory 250, and the header/ trailer of the packet from the local memory 271 using chained DMA transfers.

Supporting multiple network protocols

Figure 15A:
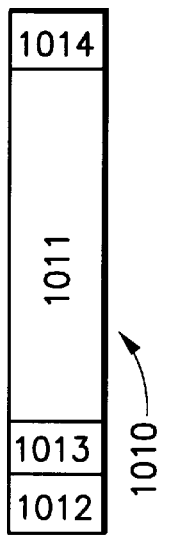
FIG. 15a shows pre-packetized data with headers of User Datagram Protocol/Internet Protocol (UDP/IP) and Internet Datagram Protocol of Xerox Networking Systems architecture (IDP/XNS), and trailer of ATM/AAL5 concatenated to a packet payload.

It is possible for different clients 2 to use different network protocol to receive data from the same server 9. For example, some clients may request data as ATM/AAL5 packets while others may request the same data as UDP Datagram. One way of handling this requirement is to append multiple headers/trailers with each packet payload as shown in FIG. 15a, where each packet 1010 of the pre-packetized data has a payload 1011, an ATM/AAL5 trailer 1014, a UDP header 1013, and a IDP (Internet Datagram Protocol) header 1012 [14]. (IDP is the network layer of XNS (Xerox Networking Systems) architecture). Packet are read from the disks to the stream buffers along with all the headers/trailers stored with them. If all headers/trailers of the same protocol stored with the different packet payloads are of the same size and are appended to the payload in the same order, the control processor can easily locate the header and trailer of the requested protocol, using simple arithmetic. If the header/trailer of the chosen protocol are partially precomputed, the fields which were not calculated or were partially calculated can be filled in by the control processor in the stream buffer (or by the network interface as discussed earlier). Then the processor creates a chained DMA transfer request linking the header/trailer of the protocol requested by the client to the beginning and end of the packet, and includes this list in the command to the network interface 220 to transmit the packet over the network.

Figure 15B:
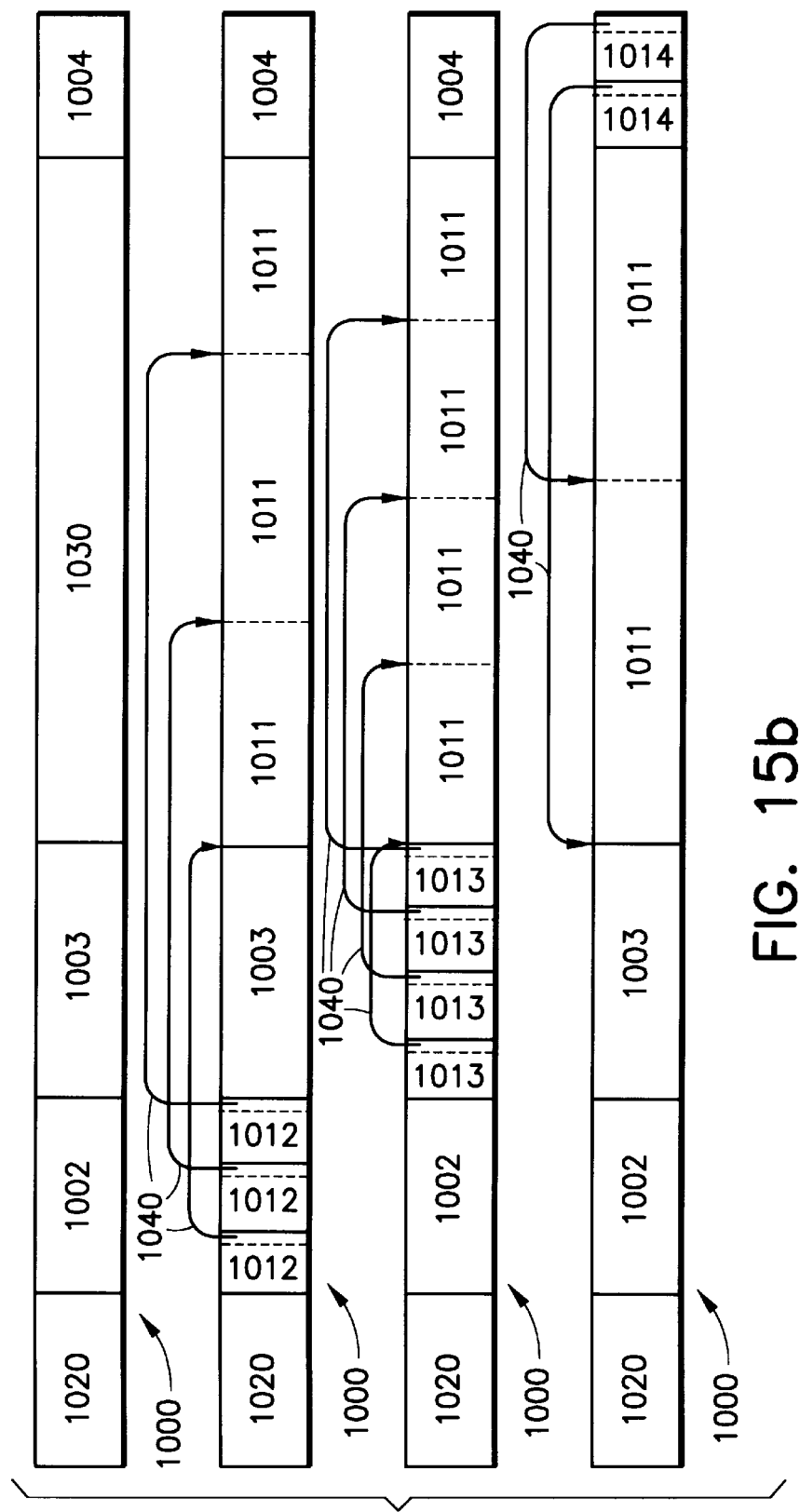
FIG. 15b shows the format of a strip of data stored on a disk which supports pre-packetization for multiple protocols, each protocol dividing the data payload in the stripe differently into packet payload.

The above approach assumes that data can be segmented into payloads identically irrespective of the network protocol chose to transmit the data over the network. Some times this may not be possible. For example, two protocols may both require fixed size payloads of different sizes, or different payload sizes may be preferred for different protocols for performance reasons. If the different protocols segment the data into payloads differently, then the stripes containing the data and headers are organized as shown in FIG. 15b. The stripe 1000 has a strip header 1020 which was described earlier. The payloads of all packets in the stripe are stored collectively in field 1030. The trailer of the ATM/AAL5 protocol for all ATM/AAL5 payloads in the stripe are stored collectively in field 1004, and the headers of the UDP and IDP protocols are stored similarly in fields 1003 and 1002. It is assumed that data in each stripe gets segmented into complete payloads by each protocol, i.e., the payloads of any protocol do not span stripes. A pointer 1040 is appended to each header, and to the trailers of protocols which do not have a header, which points to the payload of the packet in the field 1030 of the stripe. FIG. 15b also shows the fields 1002, 1003, and 1004, divided into 3 IDP headers 1012, 4 UDP headers 1013, and 2 ATM/AAL5 trailers 1014, with a pointer 1040 at the end of each header/trailer pointing to the payload 1011 for the respective protocols. An array of headers and trailers is stored for between the stripe header and the data for each of the protocols supported by the server. Note that different arrays of the header/trailer templates will have different number of templates, and while templates in an array will have the same size, the templates of different arrays will differ in size. Each header has two additional fields, the first pointing to the starting location of its payload in the data stored in the stripe, and the second containing the length of the payload. Once the entire stripe is read into the stream buffer, the control processor 270 can once again construct the chained DMA list linking the payload to be transmitted with the header/trailer of the requested protocol, the location of the payload being obtained from the header. The partially computed or not computed fields of the requested protocol are updated by the control processor 270, and the chained DMA list linking the header, payload, and trailer is sent to the network interface 220 to transmit the packet over the network.

REFERENCES

[1] Craig Partridge, "Gigabit Networking," Addison Wesley Publishing Co., Reading, Mass. 01867, ISBN 0-201-56333-9, October 1993.

[2] M. J. Bach, "The design of the Unix operating system", Prentice Hall Inc., Englewoods Cliffs, N.J., 07632, ISBN 0-13-201799-7 025, 1986.

[3] H. M. Vin and P. V. Rangan, "Designing a multiuser HDTV storage server," IEEE Jour. on Selected Areas in Communications, 11(1), January 1993, pp. 153–164.

[4] D. Kandlur, M. S. Chen, and Z. Y. Shae, "Design of a multimedia storage server," In IS&T/SPIE symposium on Electronic Imaging Science and Technology, (San Jose, Calif. 1994).

[5] A. Dan and D. Sitaram, "Buffer management policy for an on-demand video server," IBM Research Report RC 19347.

[6] A. Dan and D. Sitaram, "Scheduling policy for an on-demand video server with batching," IBM Research Report RC 19381.

[7] R. Haskin, "The Shark continuous media file server," Proc. IEEE COMPCON 1993 (San Francisco, Calif. 1993).

[8] P. M. Chen, E. K. Lee, G. A. Gibson, R. H. Katz, and D. A. Patterson, "High-Performance Reliable Secondary Storage," ACM Computing Surveys 26(2), June 1994, pp. 145–185.

[9] F. A. Tobagi, J. Pang, R. Baird, and M. Gang, "Streaming RAID—A disk array management system for video files," Proc. ACM Multimedia 1993, pp. 393–400.

[10] Jeffrey D. Stai, "SCSI Encyclopedia Vols. 1 and 2," ENDL Publications, Saratoga, Calif. 1991, ISBN 1879936100.

[11] Didier Le Gall, "MPEG: A video Compression Standard for multimedia Applications," CACM 34(4), April 1991, pp. 46–63.

[12] J. K. Dey C. S. Shih system M. Kuman, "Storage subsystem in a large multimedia server for high-speed network environments," Proc. SPIE 2188, Feb. 8–10, 1994, pp. 200–211

[13] "NCR 53C720 SCSI I/O Processor Data Manual," NCR Corporation, Dayton, Ohio.

[14] W. R. Stevens, "NIX Network Programming," Prentice-Hall Inc., Englewood Cliffs, N.J. 07632.

Appendix A: Magnetic Disk Storage (Hard Disk)

Figure 16:
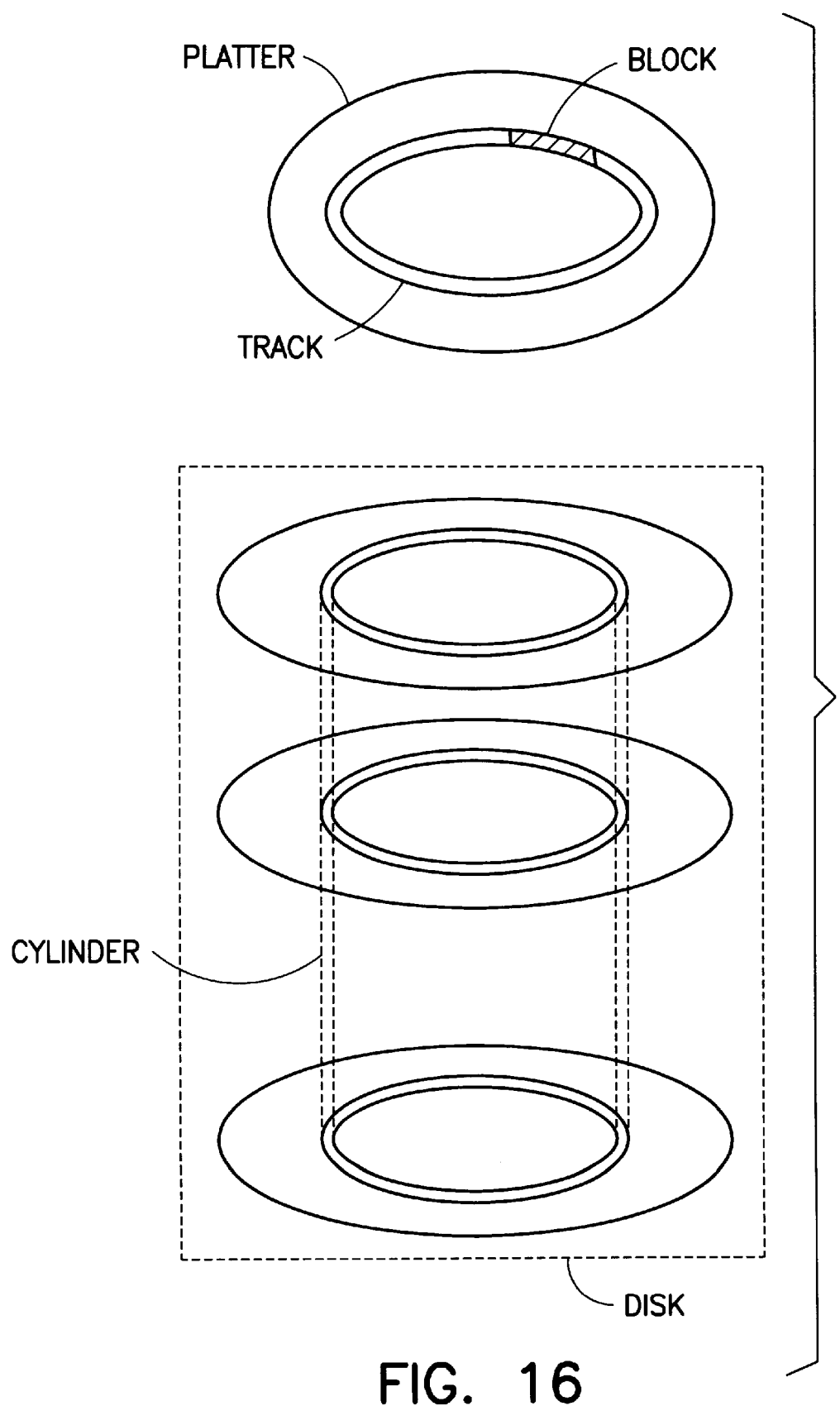
FIG. 16 is a schematic of modern magnetic disk (hard disk drive) explaining the terminology used in magnetic disk discussions.

FIG. 16 shows the structure of modern magnetic disk storage devices. A disk consists of multiple platters and both sides of the platter have a magnetic coating to form a recording surface. There is a read/write head for each recording surface, and all read/write heads are connected to the same actuator (disk arm). Therefore, all read/write heads move together, and are always at the same radial distance from the center of the platters. From a fixed position on the recording surface, the read/write head scans a few microns wide circular ring call track. Tracks at the same location on all recording surfaces form a cylinder, as shown in FIG. 16. Thus, the contents of a whole cylinder can be accessed from one position of the disk arm.

The data stored on the tracks is further divided into blocks, which is the basic unit of access in a SCSI disk drive. The time required to read a block of data comprises of three parts: 1) the time required to move the disk arm to the cylinder in which the data is stored, known as the seek time; 2) from the time the disk arm moves to the desired cylinder, the additional time for the first bit of the desired block to rotate below the read/write head, known as the rotational latency; and 3) the read time, which is the time taken by the block to rotate under the disk head. When reading consecutive blocks on the same track, the seek and rotational latency is incurred for only the first block being read. When reading consecutive blocks on the same cylinder which span two or more tracks, negligible rotational latency, and no seek latency is incurred between the reading of last block of a track and the first block of the next track. A track usually has 10 to 50 blocks.

The modern SCSI disk drives map the physical blocks on the disk to logical blocks. This mapping is done to hide the bad blocks on the disk. As a consequence the number of logical blocks on a track can vary. The read commands to the disk specify the data to be read/written in terms of logical blocks. The first and last logical blocks on a track can not be determined because of the physical to logical mapping. However, the first and last logical blocks of a cylinder can be determined. The good physical blocks on a cylinder are mapped, in order, to the logical blocks. Therefore the rotational latency between two adjacent logical blocks is minimal, even if they are not adjacent physical blocks.

One would readily see that the average rotational latency is equal to half the revolution period of the disk. The average seek time is also about the same as average rotational latency. Therefore to optimize the data throughput of the disks, the read commands to the disk must request data of the size of one or several tracks.

Having thus described out invention, what we claim as new and desire to secure by Letters Patents is:

1. In a storage system having a plurality of sets of disks and having a plurality of data units stored therein, where each of said data units is divided into stripes stored in said plurality of sets of disks and with each stripe being sorted in only one set of said disks, a method of retrieving with a single stream controller a multiplicity of requested ones of said data units simultaneously from said plurality of sets of disks, each requested data unit being requested by a corresponding one of a plurality of I/O requests for said requested ones of said data units, said single stream controller implementing the steps of:
   a. dividing each of said requests into a plurality of read commands, where each said read command is used to retrieve a single stripe of one of said data units from said plurality of sets of disks;
   b. issuing at least one read command from each of said I/O requests for which data units have not been completely retrieved; and
   c. successively repeating step b until all of said data units of said I/O requests have been retrieved.

2. A method as recited in claim 1, wherein each set of disks has only one disk therein.

3. A method as recited in claim 1, wherein said data units comprise pre-packetized data.

4. A method as recited in claim 1, wherein each of said stripes has the same play back time even if said stripes are of variable length.

5. A method as recited in claim 4, wherein, for each I/O request, said read commands are periodically issued in playback order at regular intervals of duration of said play back time, and wherein a first read command, in said playback order, of each of said requests is issued when a set of disks, of said disks, receiving said first read command is determined to have additional bandwidth available to complete any read command of said read commands within said play back time.

6. In a network having a server and a plurality of client terminals connected to said server, a method of delivering data to said clients in response to requests for said data, said method comprising:

a. pre-packeting and pre-formatting said data in the format of network packets prior to any request therefor and storing said pre-packetized and pre-formatted data in the server;

b. upon receiving a request for said data, forming a completed network packet to be transmitted by retrieving said stored pre-packetized and pre-formatted data and completing control information in the header and/or trailer of the pre-packetized and pre-formatted data; and c. transmitting said completed network packet to said requesting client.

7. A system for delivering data to a plurality of client terminals over a communications network, said system comprising:

a. a plurality of disks;

b. a host processor for pre-packetizing said data;

c. a stream controller for receiving said pre-packetized data from said host processor and storing it on said disks, said host processor receiving client requests from said clients to retrieve said pre-packetized data stored in said disks and, in response to said client requests, for sending I/O requests to said stream controller, and said stream controller transferring said requested pre-packetized data from said disks to said network in response to said I/O request, said pre-packetized data being transferred without being sent to said host processor, said stream controller transferring said pre-packetized data in the form of network packets.

8. An apparatus as recited in claim 7, wherein said stream controller comprises:

a) a plurality of disk controllers;

b) a stream buffer memory;

c) a real time control processor; and d) a network interface unit, said control processor receiving said I/O requests from said host processor and dividing each request into a plurality of read commands, said control processor producing a schedule of said read commands and transferring said scheduled read commands to said disk controllers, said disk controllers, in response to said read commands, transferring said pre-packetized data from said disk to said stream buffer memory, said control processor completing control information in the headers and trailers of said pre-packetized data to form completed network packets, said control processor scheduling transmission of said completed packets to said clients and transferring said schedule to said network interface unit, and said network interface transmitting said completed packets from said stream buffer memory to said network in accordance with said schedule, wherein said completed packets are delivered to said client by said network.

9. An apparatus as recited in claim 7, wherein said stream controller comprises:

a) a plurality of disk controllers;

b) a stream buffer memory;

c) a real time control processor; and d) a network interface unit, said control processor receiving said I/O requests from said host processor and dividing each request into a plurality of read commands, said control processor producing a schedule of said read commands and transferring said scheduled read commands to said disk controllers, said disk controllers, in response to said read commands, transferring said pre-packetized data from said disks to said stream buffer memory, said control processor scheduling transmission of said pre-packetized data to said clients and transferring said schedule to said network interface unit, and said network interface unit reading said pre-packetized data from said stream buffer memory and completing control information in headers and trailers of said pre-packetized data to form completed network packets, and said network interface also transmitting said completed packets to said network in accordance with said schedule, wherein said completed packets are delivered to said client from said network.

* * * * *